(12) United States Patent
Abedini et al.

(10) Patent No.: US 12,136,990 B2
(45) Date of Patent: Nov. 5, 2024

(54) PHASE NOISE MANAGEMENT OF OUT-OF-BAND REPEATER

(71) Applicant: QUALCOMM Incorporated, San Diego, CA (US)

(72) Inventors: Navid Abedini, Basking Ridge, NJ (US); Tianyang Bai, Somerville, NJ (US); Jianghong Luo, Skillman, NJ (US); Yavuz Yapici, Florham Park, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/452,386

(22) Filed: Aug. 18, 2023

(65) Prior Publication Data

US 2023/0396318 A1 Dec. 7, 2023

Related U.S. Application Data

(62) Division of application No. 17/451,625, filed on Oct. 20, 2021, now Pat. No. 11,770,177.

(51) Int. Cl.
*H04B 7/155* (2006.01)
*H04B 17/345* (2015.01)
*H04B 17/382* (2015.01)

(52) U.S. Cl.
CPC ..... *H04B 7/15585* (2013.01); *H04B 7/15571* (2013.01); *H04B 17/345* (2015.01); *H04B 17/382* (2015.01)

(58) Field of Classification Search
CPC ............ H04B 7/15585; H04B 7/15571; H04B 17/345; H04B 17/382; H04B 7/1555;
(Continued)

(56) References Cited

U.S. PATENT DOCUMENTS 6,745,005 B1 6/2004 Lou et al.
8,178,994 B2 * 5/2012 Carroll ...................... H04B 3/58
455/13.1
(Continued)

FOREIGN PATENT DOCUMENTS

WO 2005122428 A2 12/2005

*Primary Examiner* — Lana N Le
(74) *Attorney, Agent, or Firm* — Procopio, Cory, Hargreaves & Savitch LLP

(57) ABSTRACT

A first wireless device transmits one or more transmissions for a second wireless device to a repeater for repetition to the second wireless device; adjusts a repeater operation based on a phase noise in transmission between the first wireless device and the repeater; and communicates with at least one of the repeater or the second wireless device based on the adjusted repeater operation. A repeater receives from a first wireless device, a request for the repeater to report a phase noise in transmissions between the first wireless device and the repeater for repetition with a second wireless device; and transmits a report of the phase noise to the first wireless device based on the request. A repeater receives, from a first wireless device, a transmission for repetition with a second wireless device; and transmits the repetition of the transmission to the second wireless device with a phase noise compensation.

30 Claims, 15 Drawing Sheets

(58) Field of Classification Search
CPC .... H04B 7/15; H04B 17/318; H04B 7/15507; H04B 3/58; H04B 10/29; H04B 7/155; H04B 10/5561; H04B 2203/5479; H04B 7/15557; H04B 1/0475; H04B 1/1027; H04B 10/2507; H04B 10/50597; H04B 2203/5441; H04B 3/36; H04B 7/06; H04B 7/00; H04B 7/14; H04W 84/047; H04W 24/10; H04W 52/46; H04W 84/20; H04W 4/00; H04W 52/0206; H04W 72/542; H04W 88/04; H04W 88/06; H04W 88/085; H04W 72/21; H04W 72/23; H04W 24/02; H04W 28/16; H04W 40/02; H04W 48/01

See application file for complete search history.

(56) References Cited

U.S. PATENT DOCUMENTS

| | | | |
|---|---|---|---|
| 9,042,739 B2* | 5/2015 | Sekiya | H04B 10/29 |
| 10,484,078 B2* | 11/2019 | Gharavi | H04W 52/46 |
| 10,951,265 B1 | 3/2021 | Henry et al. | |
| 11,283,510 B2 | 3/2022 | Tarighat Mehrabani | |
| 11,659,459 B2* | 5/2023 | Soltani | H04W 84/047 |
| | | | 370/331 |
| 2006/0019603 A1 | 1/2006 | Pergal | |
| 2006/0056338 A1 | 3/2006 | Abe et al. | |
| 2007/0165581 A1 | 7/2007 | Mehta et al. | |
| 2009/0088071 A1* | 4/2009 | Rofougaran | H04B 7/155 |
| | | | 455/11.1 |
| 2010/0177668 A1* | 7/2010 | Ahn | H04B 7/15585 |
| | | | 370/279 |
| 2011/0170473 A1* | 7/2011 | Proctor, Jr. | H04B 7/15585 |
| | | | 370/315 |
| 2019/0020407 A1* | 1/2019 | Gharavi | H04W 52/46 |
| 2019/0207668 A1* | 7/2019 | Koifman | H04W 72/21 |
| 2020/0322037 A1 | 10/2020 | Abedini et al. | |
| 2020/0367257 A1 | 11/2020 | Hormis et al. | |
| 2022/0408289 A1* | 12/2022 | Soltani | H04W 24/10 |
| 2023/0087814 A1* | 3/2023 | Sevindik | H04B 7/155 |
| 2023/0119750 A1 | 4/2023 | Abedini et al. | |

* cited by examiner

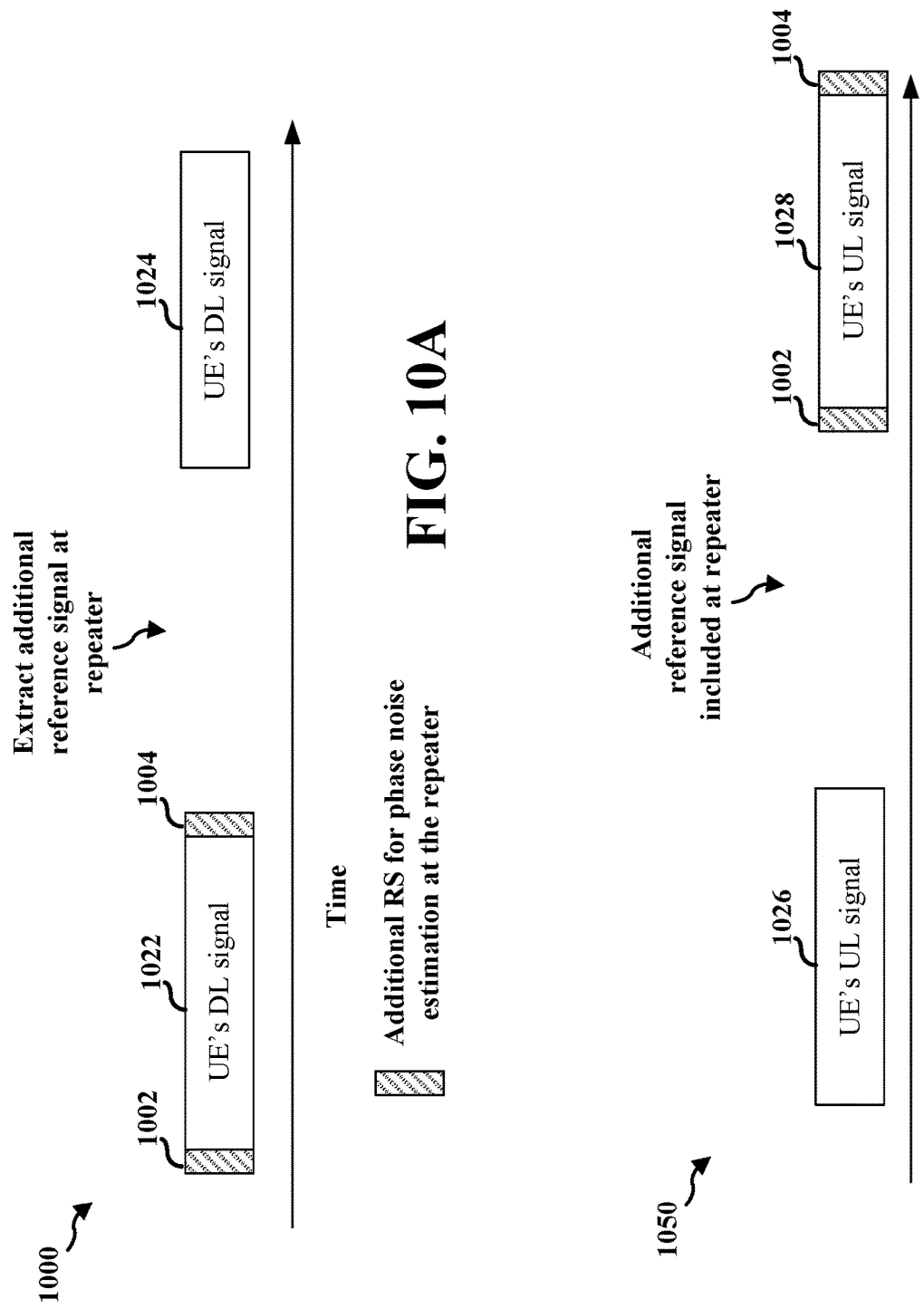

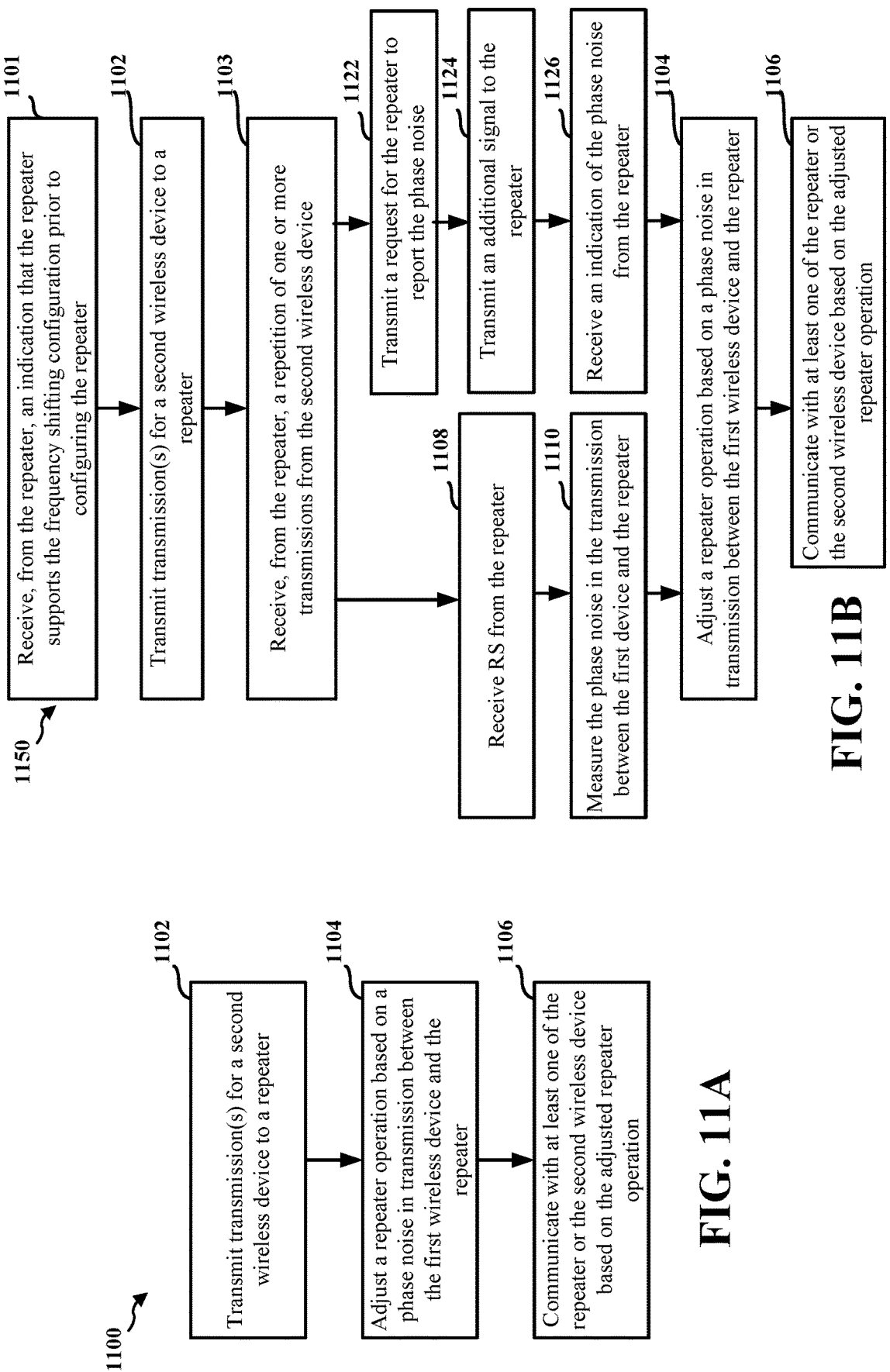

PHASE NOISE MANAGEMENT OF OUT-OF-BAND REPEATER

CROSS REFERENCE TO RELATED APPLICATION(S)

This application is a divisional of U.S. application Ser. No. 17/451,625, entitled "Phase Noise Management of Out-of-Band Repeater" and filed on Oct. 20, 2021, which is expressly incorporated by reference herein in its entirety.

TECHNICAL FIELD

The present disclosure relates generally to communication systems, and more particularly, to wireless communication including a repeater.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first wireless device. The apparatus transmits one or more transmissions for a second wireless device to a repeater for repetition to the second wireless device; adjusts a repeater operation based on a phase noise in transmission between the first wireless device and the repeater; and communicates with at least one of the repeater or the second wireless device based on the adjusted repeater operation.

In another aspect of the disclosure, a method, a computer-readable medium, and an apparatus are provided for wireless communication at a repeater. The repeater receives from a first wireless device, a request for the repeater to report a phase noise in transmissions between the first wireless device and the repeater for repetition with a second wireless device; and transmits a report of the phase noise to the first wireless device based on the request.

In another aspect of the disclosure, a method, a computer-readable medium, and an apparatus are provided for wireless communication at a repeater. The repeater receives, from a first wireless device, a transmission for repetition with a second wireless device; and transmits the repetition of the transmission to the second wireless device with a phase noise compensation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 10A and 10B illustrate example aspects of reference signal insertion and removal at a repeater, in accordance with aspects presented herein.

FIGS. 11A and 11B are flowchart of a method of wireless communication, at a base station in accordance with aspects presented herein.

DETAILED DESCRIPTION

Figure 1:
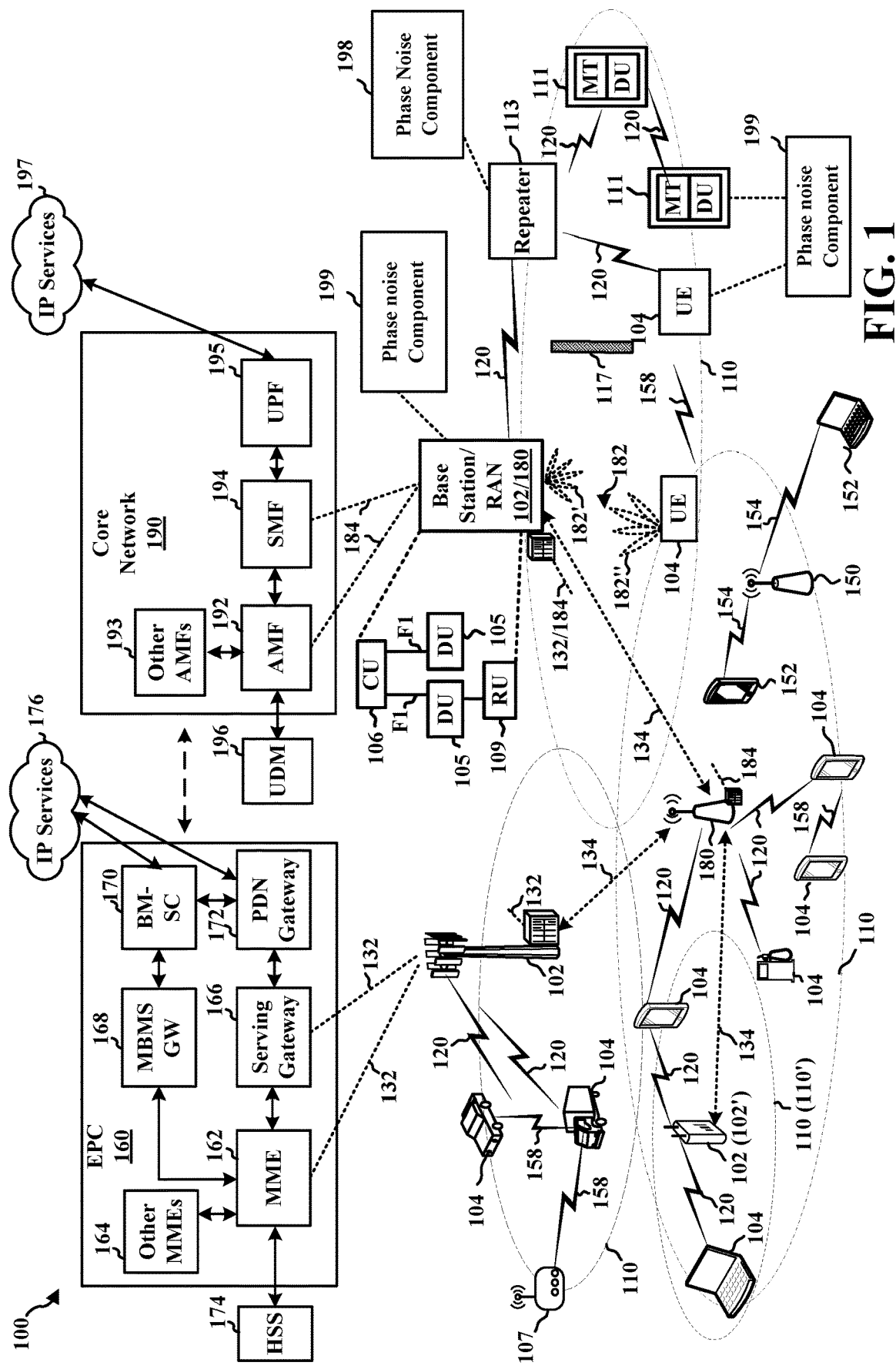
FIG. 1 is a diagram illustrating an example of a wireless communications system and an access network, in accordance with aspects presented herein.

In certain situations, direct communication between a first wireless device and a second wireless device may be difficult because there is a blockage between the devices or because the second wireless device is out of range of the first wireless device. In such scenarios, a repeater device may be configured to extend the coverage of the second wireless device by amplifying the signals transmitted between the first wireless device and the second wireless device. As an example, a base station may transmit downlink communication for a UE to a repeater for repetition to the UE, and may receive repetitions of uplink transmissions of the UE from the repeater. A link between the base station and the repeater may be referred to as a fronthaul link, and a link between the repeater and the UE may be referred to as an access link.

In some examples, the repeater may support control by a control node, such as a base station, so that a configuration of the repeater can be dynamically adjusted or reconfigured depending on the conditions of the communication system. An out-of-band repeater may operate in different frequency ranges over a fronthaul link with a base station and an access link with a UE. For example, the repeater may transmit and receive signals on the fronthaul link with the base station in FR2, and may transmit and receive signals on the access link with the UE in FR1. In some aspects, the repeater may shift the frequency of the signal that it forwards, or repeats, between the base station and the UE. For example, when repeating/forwarding an uplink transmission from the UE to the base station, the repeater may shift the center frequency of the uplink signal from FR1 to FR2 before forwarding the signal to the base station. The repeater may shift the frequency without changing the numerology of the forwarded signal. The downlink signals for the UE and the uplink signals from the UE may be based on FR1 numerologies (e.g., a 15 kHZ or 30 kHz subcarrier spacing (SCS)).

In some aspects, phase noise may be introduced in signals based on higher frequency (e.g., FR2) components such as local oscillators. The repeater and the base station may experience phase noise in the FR2 signals. The phase noise may affect the UE's signal, which has a smaller SCS and longer symbol duration. The UE may not have a way to compensate for the added phase noise that is introduced based on the signal between the base station and the repeater.

Aspects presented herein provide techniques for addressing or correcting phase noise in the UE's signal, e.g., due to the FR2 signal between the repeater and the base station. In some aspects, a base station may determine a level of the phase noise on the UE's sub-6 signal and may adjust a repeater configuration or stop using a repeater in response phase noise level. The base station may measure a phase noise in the uplink signal forwarded by the repeater or may receive a report of the phase noise from the repeater. In some aspects, the repeater may apply compensation for the phase noise before forwarding the UE's signal.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102 and 180, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The wireless communication system of FIG. 1 may further include repeaters 113 that forward communication between a base station 102/180 and a UE 104. The repeater 113 may be an analog repeater that receives, amplifies, and forwards a signal between the base station 102/180 and UE 104 over communication links 120. As an example, the repeater 113 may provide additional coverage for a base station 102/180 that may have a signal to a UE 104 at least partially blocked by a blockage 117. The repeater 113 may include a component that is capable of receiving control signaling from a control node (e.g., the base station 102, 180) and a repeating unit that forwards the communication with one or more parameters based on the control signaling. In some examples, the repeating may be referred to as a remote unit. In some examples, the repeater may be referred to as a pass-through repeater.

As described herein, the control node may include the base station 102, 180, the IAB node 111, etc. The first wireless device may include the base station 102, 180, the IAB node 111, the UE 104, or another repeater. The second wireless device may include the base station 102, 180, the IAB node 111, the UE 104, or another repeater.

In some aspects, a base station 102 or 180, UE 104, or IAB node 111, may transmit transmissions for a second wireless device to a repeater 113 for repetition to the second wireless device (e.g., a UE 104, base station 102/180, IAB node 111, etc.). Similarly, the base station 102 or 180, UE 104, or IAB node 111 may receive repeated transmissions from the second wireless device via the repeater 113. A base station 102/180, UE 104, IAB node 111, or other device may include a phase noise component 199 configured to adjust a repeater operation based on a phase noise in transmission between the first wireless device and the repeater 113 and to apply the adjusted repeater operation to communicate with the second wireless device and/or the repeater. The repeater 113 may include a phase noise component 198 that is configured to receive a request for the repeater 113 to report a phase noise in transmissions (e.g., between the base station 102/180 and the repeater 113) for repetition to a second wireless device (e.g., with at least one UE 104) and to transmit a report of the phase noise to the first wireless device based on the request. The phase noise component 198 may be configured to receive a transmission from a first wireless device for repetition to at least one second wireless device and to transmit the repetition of the transmission to the second wireless device with a phase noise compensation. Although the following description may be focused on 5G NR, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
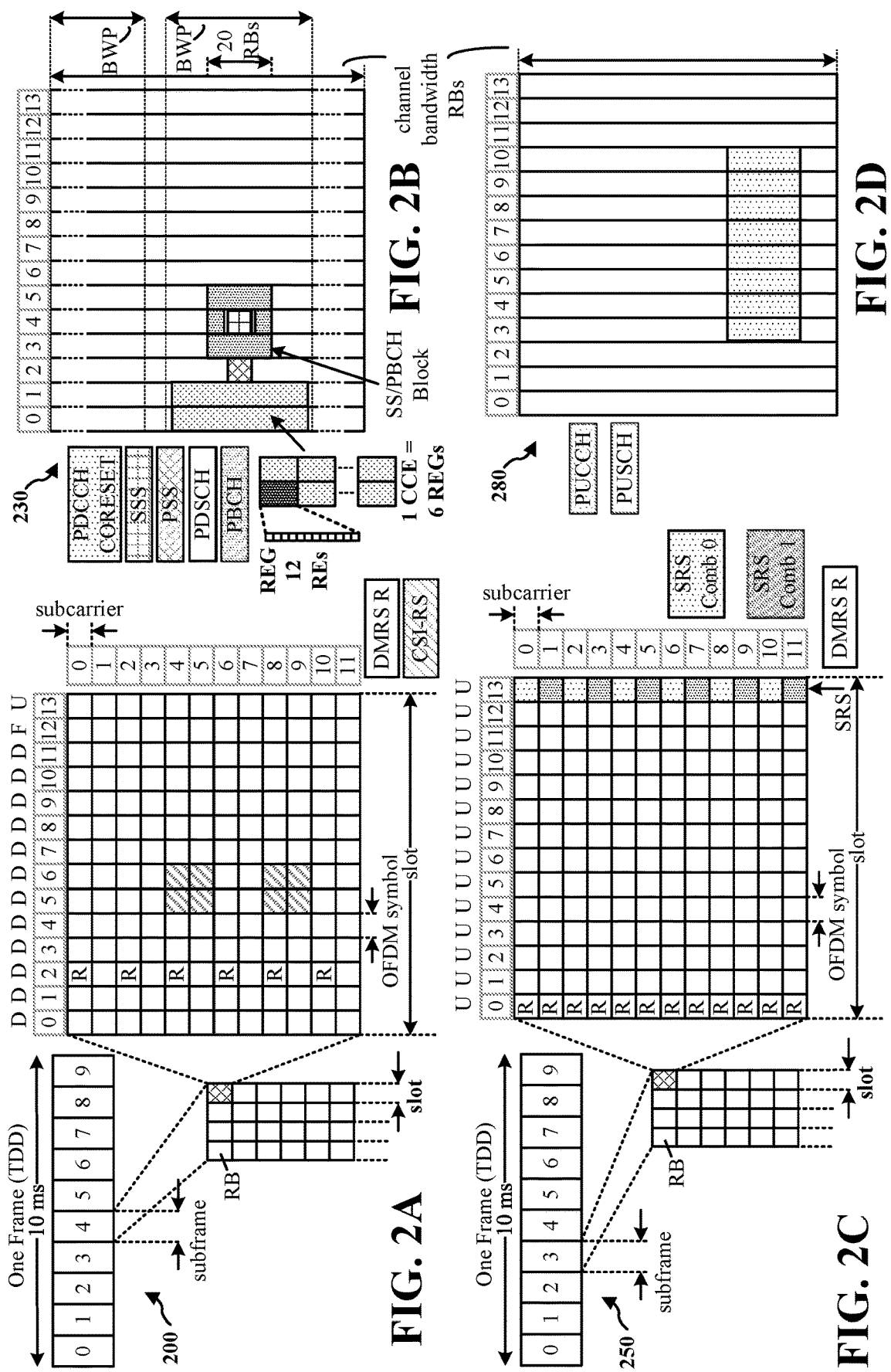
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
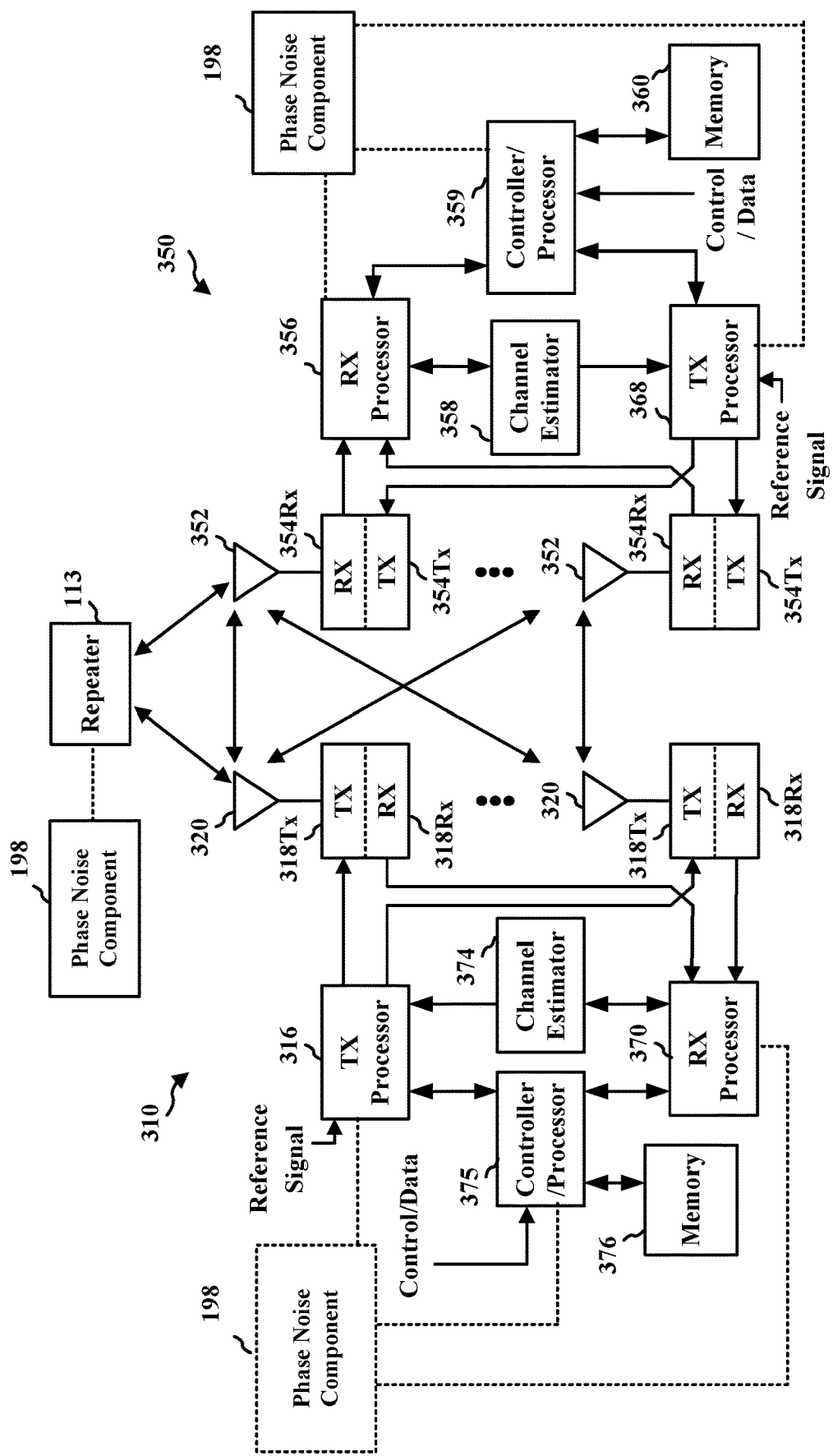
FIG. 3 is a diagram illustrating an example of a base station and user equipment (UE) in an access network with a repeater, in accordance with aspects presented herein.

FIG. 3 is a block diagram of a base station 310 in communication with a UE 350 in an access network. In some examples, a repeater 113 may amplify and/or forward communication between the base station 310 and the UE 350. In some examples, the repeater 113 may amplify and forward wireless communication between other devices, e.g., including IAB nodes or other repeaters in addition to the examples with UEs and base stations. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

As illustrated, the repeater 113 may be configured to perform aspects in connection with the phase noise component 198 of FIG. 1.

At least one of the TX processor 316, the RX processor 370, and the controller/processor 375 may be configured to perform aspects in connection with the phase noise component 199 of FIG. 1.

In certain situations, direct communication between a base station and a UE may be at least partially blocked by a blockage, such as shown at 117 in FIG. 1, or the UE may be out of range of the base station. A repeater device may be configured to extend the coverage of the base station by amplifying the signals transmitted between the base station and the UE. In addition to forwarding signals between a base station and a UE, a repeater may forward signals between other devices, such as a base station, IAB node, UE, etc. A repeater is a relay node that performs an amplify and forward operation between two wireless nodes. The repeater may provide a simple and cost-effective way to improve network coverage. The amplify and forward operation of the repeater may be different than a relay node that decodes and forwards the communication, such as an IAB node. A relay node that decodes communication before forwarding the signal may be referred to as a decode and forward relay node.

In some aspects, a repeater may be capable of some types of control, and may receive information such as timing information (e.g., about a slot, symbol, subframe, frame boundary, etc.) about the communication being forwarded, time division duplex (TDD) uplink/downlink configuration, ON-OFF scheduling for the repeater, and/or spatial information for beam management. A first type of repeater may be referred to as a traditional repeater and may amplify and forward the signal without any additional information or control. The repeater may be in an always on state and may receive and forward signals without a change in repeater parameters. A second type of repeater may be referred to as an autonomous smart repeater that is capable of obtaining, acquiring, or inferring information to adjust repeater operation, e.g., without direct control signaling. As an example, the second type of repeater may obtain information based on receiving and decoding broadcast channels, and may adjust one or more repeater parameter based on the obtained information. A third type of repeater may be referred to as a network controlled repeater and may support some aspects of configuration or control based on side information provided to the repeater by a base station. The repeater may receive the information/control signaling/configuration via an established control interface with the base station. In some aspects, the repeater may adjust operation based on side information provided/controlled by the base station without additional side information inferred/obtained by the repeater. In other aspects, the repeater adjust operation based on side information provided/controlled by the base station and also based on remaining side information inferred/obtained/acquired by the repeater itself. In some aspects, the use of the combination of side information from the base station and additional side information obtained/acquired/inferred by the repeater may reduce control signaling overhead and/or latency for the adjustment of parameters at the repeater.

Figure 4A:
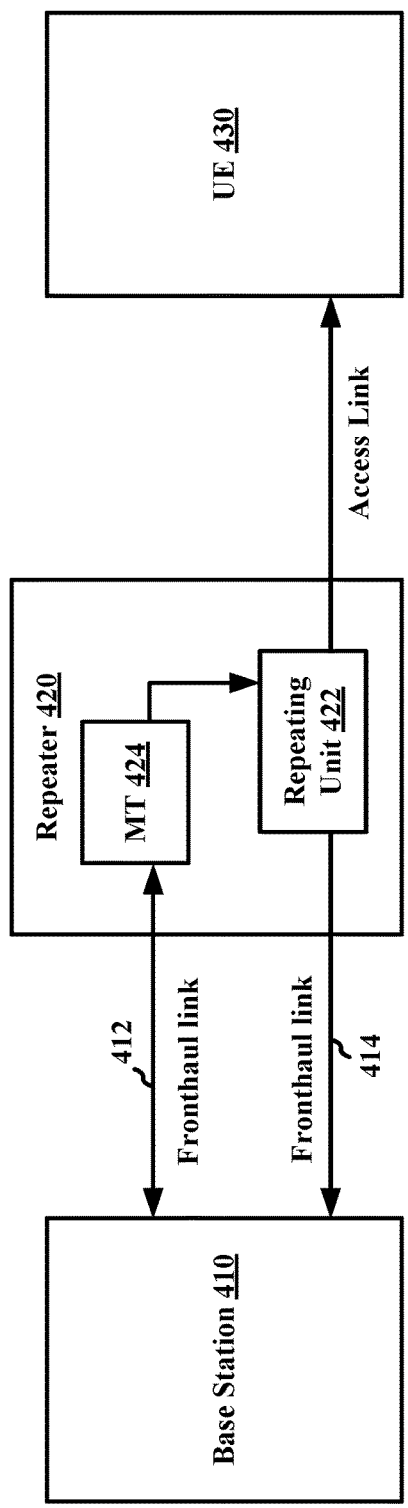
FIG. 4A illustrates a communication system including a repeater, in accordance with aspects presented herein.

FIG. 4A is a block diagram of an example communication system 400 including a base station 410, a UE 430, and a repeater 420. The repeater 420 may include a repeating unit 422 and a mobile termination component 424 ("MT"). In some examples, the repeating unit 422 may be referred to as a remote unit. The base station 410 may correspond to the base station 102, 180 in FIG. 1 or the base station 310 in FIG. 3. The UE 504 may correspond to the UE 104 in FIG. 1 or the UE 350 in FIG. 3.

In FIG. 4A, the repeating unit 422 of the repeater 420 may be configured to amplify and transmit downlink signals from the base station 410 to the UE 430 using an access link 414. The repeating unit 422 may also be configured to amplify and transmit uplink signals from the UE 430 to the base station 410 using the access link 414. Thus, the access link 414 may be used as a path that carries uplink signals from the UE 430 and/or downlink signals to the UE 430. In some examples, the access link 414 may be controlled by the base station 410.

In some examples, the base station 410 may also establish a front-haul link 412 with the mobile termination component 424 of the repeater 420. The front-haul link 412 may be configured to carry UL/DL control signals to configure the operation of the repeater 420. For example, the front-haul link 412 may use a control interface of the base station 410 to send messages to the repeater 420 to control the beamforming procedures or computations for downlink/uplink transmissions such as using different beams or beams directed to different directions to transmit to different UEs. Although FIG. 4A illustrates an example in which the control node is a base station, in other examples, the control node may be a different device, such as an IAB node. Additionally, the control node may provide control signaling to the repeater for use in repeating communication originating at a different device.

Figure 4B:
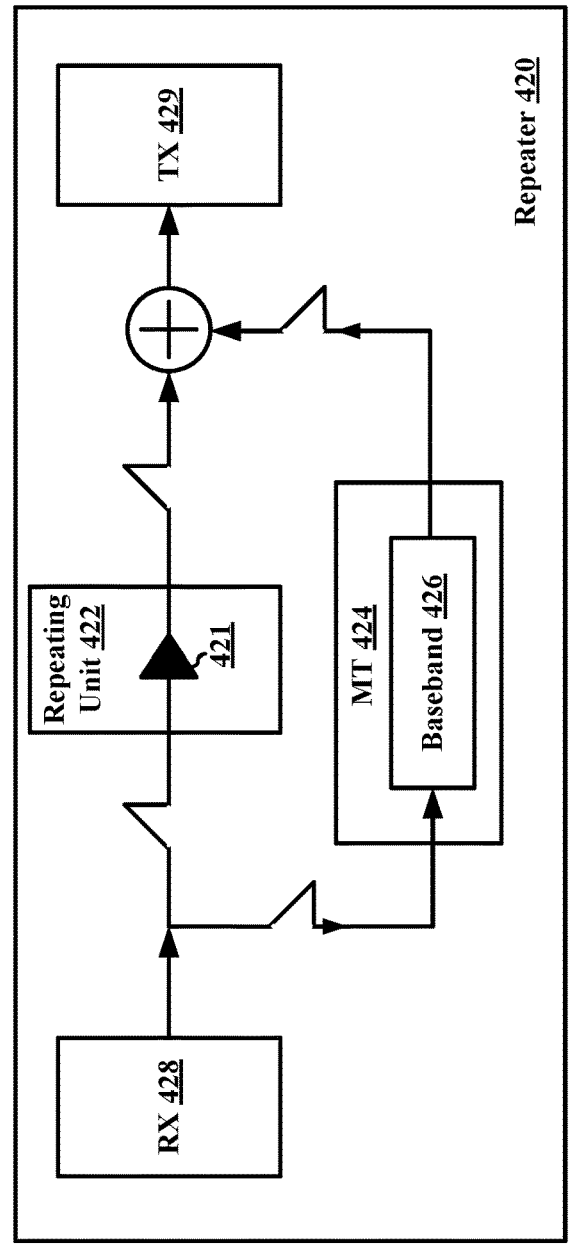
FIG. 4B is a diagram of example components of a repeater, in accordance with aspects presented herein.

FIG. 4B is an example of a schematic diagram of the repeater 420 including a repeating unit 422 and a mobile termination component 424. The repeater 420 may also include a receive array 428 ("RX") and a transmit array 429 ("TX"). The receive array 428 may receive UL/DL signals (e.g., over a control link with a control node and access links with one or more devices for which the repeater forwards communication) and the transmit array 429 may transmit UL/DL signals (e.g., over the control link and access link(s)). The repeater 420 may include an analog amplifier 421 to amplify the UL/DL signals received at the receive array 428 and pass the amplified signals to the transmit array 429 (e.g., amplify and forward).

In FIG. 4B, the mobile termination component 424 includes a baseband processor 426 configured to receive control signaling from a control node (such as the base station 410) through the receive array 428. For example, the mobile termination component 424 may decode the control signaling to determine the control information provided by the base station, whereas the repeating unit 422 amplifies and forwards the UL/DL signal (e.g., to the UE 430) without decoding the UL/DL signal. The control signaling may include control parameters for the repeater 420 in forwarding communication (e.g., between the base station 410 and the UE 430). The repeater 420 applies the control configuration to the repeating unit 422 component. For example, the repeating unit 422 may apply one or more control parameters to the receive array 428 and/or the transmit array 429 based on the control received by the mobile termination component 424 from the control node. The repeating unit 422 may receive and process a control signal from a control node similar to the UE 350 described in connection with FIG. 3.

Figure 5:
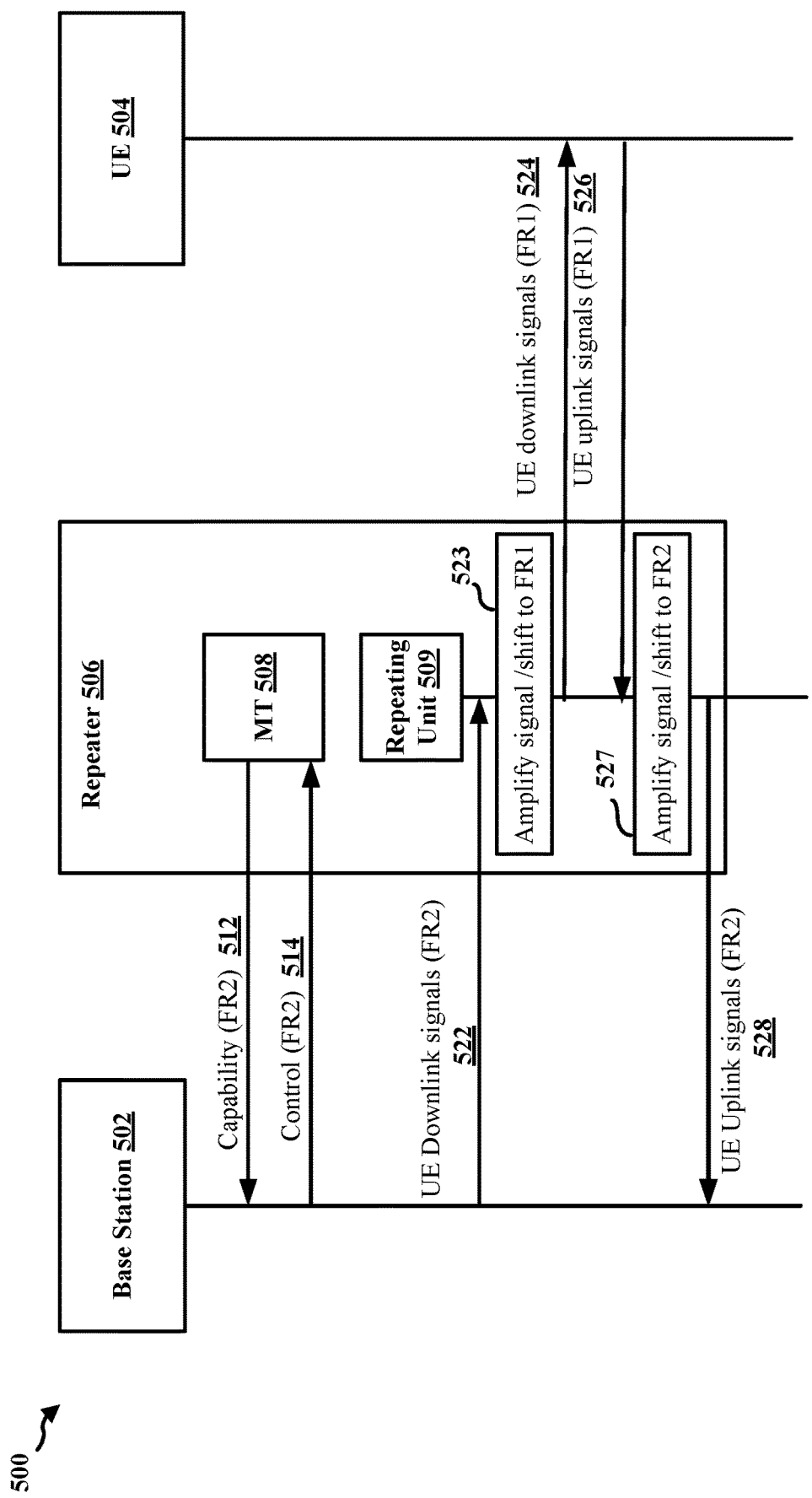
FIG. 5 is a communication flow between a base station, a repeater, and a UE, in accordance with aspects presented herein.

FIG. 5 illustrates an example communication flow 500 between a first wireless device and a second wireless device with an amplify and forward repeater device 506. The example in FIG. 5 illustrates an example for a base station 502 and a UE 504, but the aspects may be similarly applied for repetitions between a UE and UE, an IAB node and UE, an RSU and UE. Similarly, the aspects performed by the base station 502 may be performed by a UE, an IAB node, an RSU, or another wireless device. Although aspects are described in connection with repetition between a base station and a UE, the aspects may be applied for repetition between two other wireless devices, such as between any of a base station, IAB node, UE, another repeater, etc.

In some examples, the repeater device 506 may be controlled by a control node, such as the base station 502. In other examples, the control node may be separate from the base station or from the device transmitting a signal to be repeated by the repeater device 506. The configuration of the repeater device 506 can be adjusted or reconfigured (statically or dynamically) depending on the conditions (e.g., internal conditions, external conditions, and/or environmental conditions) of the communication system including the base station 502, the UE 504, and the repeater device 506. For example, the base station 502 may transmit control signaling 514 to reconfigure the beamforming procedures of the repeater device 506 based on a change in conditions.

The control signaling 514 may indicating beamforming information for the repeater device 506, e.g., such as a reception beam for receiving communication from the base station 502 and/or one or more transmission beams for forwarding communication to the UE 504. The control signaling 514 may indicate a transmission power for the repeater to use in uplink and/or downlink forwarding. The control signaling 514 may indicate an operating bandwidth. In some examples, the operating bandwidth may include frequency processing and filtering. The control signaling 514 may indicate a time domain resource allocation for the repeater device 506. The time domain resource allocation may include an UL/DL pattern that indicates when the repeater device 506 is configured to use UL and DL resources. For example, a time domain resource allocation may indicate time resources for the repeater device 506 to apply the indicated beamforming configuration. In some examples, the repeater device 506 may be configured with more than one beam to be applied at different times, e.g., a set of beams to apply in a pattern. The control signaling 514 may include ON-OFF scheduling that turns the repeater, or the repeater operation, on and off at particular times or for particular durations. The control signaling 514 may indicate timing information, such as a slot, symbol, subframe, or frame boundary, for downlink and uplink transmissions with the base station. In some aspects, the repeater may transmit an indication of support for (e.g., a capability) receiving control signaling or additional information from the base station 502, at 512. The base station 502 may send the control signaling based on the capability of the repeater device 506.

The control signaling may be transmitted or received on a control interface established with the base station 502 and an MT 508 (or other component capable of receiving control) of the repeater device 506.

The amplify and forward operation may be performed by a repeating unit 509 of the repeater device 506. As illustrated, the base station 502 may transmit a UE downlink signal 522 to the repeater device 506 for forwarding to the UE 504. At 523, the repeater device 506 may amplify the downlink signal 522 from the base station 502, and/or may shift the frequency of the downlink signal from FR2 to FR1. The numerology (e.g., of the downlink signal 522 in FR2 and the downlink signal 524 after being shifted to FR1) may be based on an FR1 numerology. The repeater may apply the control information received at 514 in receiving the downlink signal and/or in forwarding the downlink signal to the UE 504 at 524. The UE 504 may transmit a UE uplink signal 526 to the repeater device 506 for forwarding to the base station 502. At 527, the repeater device 506 may amplify the uplink signal 526 from the base station 502, and/or may shift the frequency of the uplink signal from FR1 to FR2. The numerology (e.g., of the uplink signal 526 in FR1 and the uplink signal 528 after being shifted to FR2) may be based on an FR1 numerology. The repeater may apply the control information received at 514 in receiving the uplink signal and/or in forwarding the UE uplink signal 528 to the base station 502.

A link between the base station 502 and the repeater device 506 may be referred to as a fronthaul link, and a link between the repeater device 506 and the UE 504 may be referred to as an access link. As illustrated in FIG. 5, the repeater device 506 may be an out-of-band repeater that operates in different frequency ranges over a fronthaul link with a base station and an access link with a UE. For example, the repeater device 506 may transmit and receive signals on the fronthaul link with the base station in FR2, and may transmit and receive signals on the access link with the UE in FR1. In some aspects, the repeater may shift the frequency of the signal that it forwards, or repeats, between the base station 502 and the UE 504. For example, when repeating/forwarding an uplink transmission from the UE 504 to the base station 502, the repeater device 506 may shift the center frequency of the uplink signal from FR1 to FR2 before forwarding the signal to the base station. The repeater may shift the frequency without changing the numerology of the forwarded signal. The downlink signals for the UE and the uplink signals from the UE may be based on FR1 numerologies (e.g., a 15 kHZ or 30 kHz SCS). The waveform communicated between the repeater device 506 and the base station in FR2 may be based on an FR1 numerology.

In some aspects, phase noise may be introduced in signals based on higher frequency (e.g., FR2) components such as local oscillators. The noise incurred in the oscillators may result in phase modulation of the information signal, and may lead to changes in the frequency spectrum and timing properties of the information signal. The noise related to the oscillators may be referred to as phase noise. Phase noise produced in local oscillators may introduce a significant degradation in some frequencies, such as at mmW frequencies, e.g., depending on the power spectral density of phase noise. Phase noise leads to a common phase error (CPE) and/or inter-carrier interference (ICI). CPE may lead to an identical, or similar, rotation of a received symbol in each subcarrier. ICI may lead to a loss of orthogonality between the subcarriers.

The repeater device 506 and the base station 502 may experience phase noise in the FR2 signals. The phase noise may affect the UE's signal, which has a smaller SCS and longer symbol duration. The UE 504 may not have a way to compensate for the added phase noise that is introduced based on the signal between the base station 502 and the repeater device 506. As an example, the UE signals may not include a phase tracking reference signal (PTRS) as the signals 524 and 526 may be in a frequency range (e.g., FR1), that does not include signaling framework for a PTRS.

Aspects presented herein provide techniques for addressing or correcting phase noise in the UE's signal (uplink or downlink), e.g., due to the FR2 signal between the repeater device 506 and the base station 502.

Figure 6:
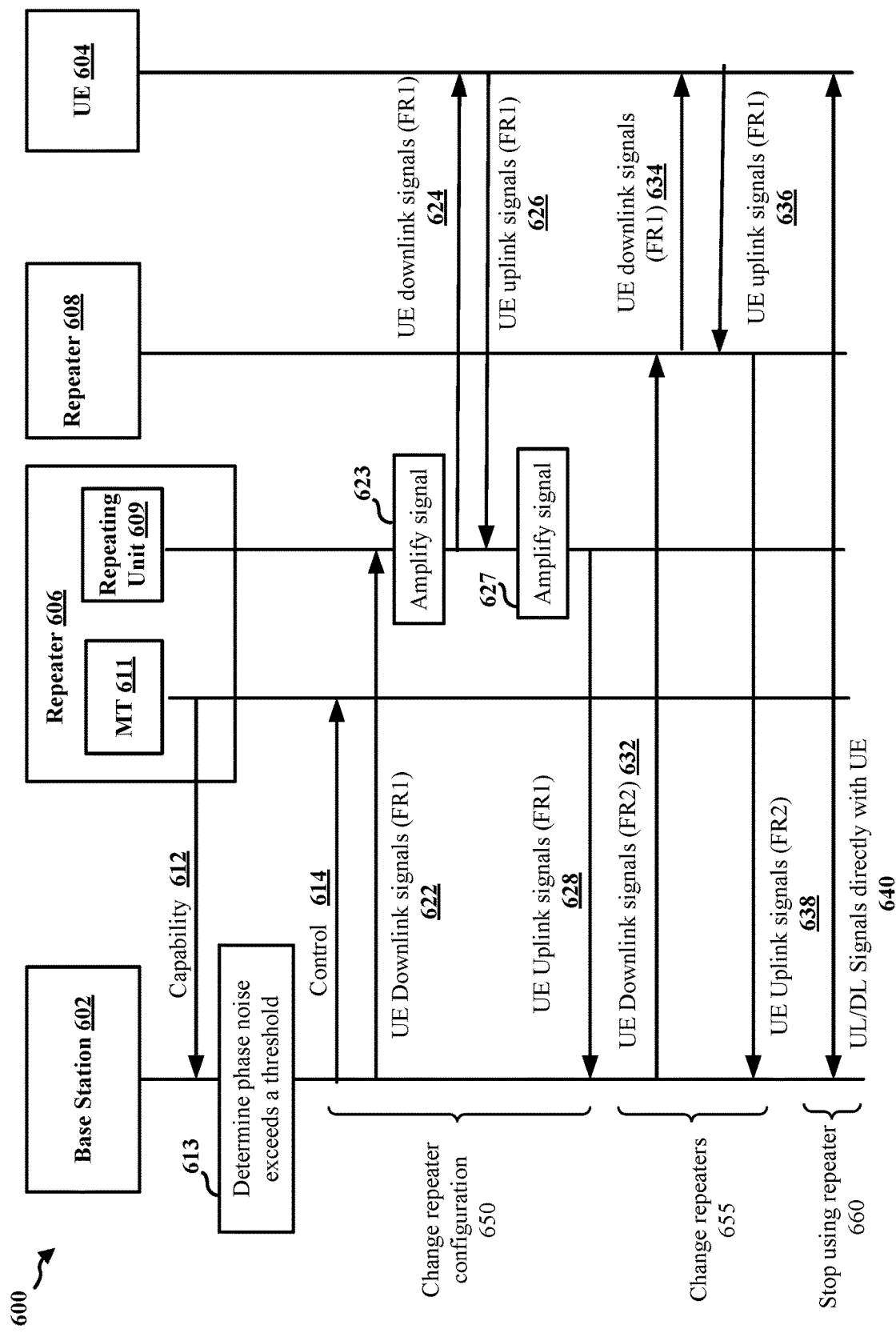
FIG. 6 is a communication flow between a base station, a repeater, and a UE, in accordance with aspects presented herein.

In some aspects, a base station may determine a level of the phase noise on the UE's sub-6 signal and may adjust a repeater configuration or stop using a repeater in response phase noise level. FIG. 6 illustrates an example communication flow 600 between a first wireless device and a second wireless device with an amplify and forward repeater 606. The example in FIG. 6 illustrates an example for a base station 602 and a UE 604, but the aspects may be similarly applied for repetitions between a UE and UE, an IAB node and UE, an RSU and UE. Similarly, the aspects performed by the base station 602 may be performed by a UE, an IAB node, an RSU, or another wireless device. FIG. 6 illustrates an example communication flow 600 between a base station 602, a repeater 606 (that may include an MT 611 and repeating unit 609), and a UE 604. The aspects of FIG. 6 may be employed in connection with the aspects described in connection with FIG. 5. The repeater 606 may be referred to as a frequency shifting repeater, as the repeater 606 may shift the frequency of the UE signals between FR1 and FR2, as described in connection with FIG. 5. The base station 602 may determine the severity level of the phase noise on the UE's sub-6 signal, at 613, and accordingly may adjust the configuration/operation of the repeater 606.

If the base station 602 determines that the phase noise level is below a threshold, the base station 602 may continue to use the frequency shifting repeater 606, and may continue to use an FR2-FR1 frequency shifting configuration for the forwarding operation of the repeater 606.

If the base station determines, e.g., at 613, that the phase noise meets or exceeds the threshold, the base station 602 may, in first aspects or a first option 650, change a configuration of the repeater 606. For example, the repeater 606 may support a configuration to perform FR2-FR1 frequency shifting, e.g., as described in connection with FIG. 5 and may support an amplify and forward operation without frequency shifting. The operation without frequency shifting may be referred to as FR1-FR1 operation, and the amplify ad forward operation with frequency shifting may be referred to as FR2-FR1 operation. In some aspects, the repeater 606 may signal support, at 612, for one or more types of operation, and may indicate to the base station 602 that the repeater 606 supports FR2-FR1 operation, FR1-FR1 operation, and/or that the repeater supports a configuration change between FR2-FR1 and FR1-FR1 operation. In response to the phase noise, as determined at 612, the base station 602 may indicate to the repeater 606, at 614, to adopt a different configuration (such as a FR1-FR1 operation/configuration in which the repeater receives and forwards signals in the same FR and without performing a frequency shift). For example, the repeater 606 may correspond to the repeater device 506 in FIG. 5, and may have been applying a frequency shift at 523 and 527. As illustrated in FIG. 6, the repeater 606 may change to amplify the downlink signal 622 without a frequency shift, at 623, before repeating the downlink signal 624 to the UE 604. Similarly, the repeater 606 may amplify and forward the uplink signal 626, at 627, from the UE 604 to the base station 602 at 628, e.g., without a frequency shift to FR2.

In other aspects, if the base station determines, e.g., at 613, that the phase noise meets or exceeds the threshold, the base station 602 may decide to stop using the repeater 606 to communicate with the UE 604. As a second option or aspect 655, the base station may switch to a different repeater 608. The base station 602 may transmit downlink signals 632 to the new repeater 608 for forwarding to the UE 604 at 634. The UE 604 may transmit uplink signals 636 to the new repeater 608 for forwarding to the base station 602, as uplink signal 638. The repeater 608 may perform an amplify and forward operation with frequency shifting or without frequency shifting, e.g., based on a capability of the repeater 608, and/or a configuration provided to the repeater 608 by the base station 602. In other a third option or aspect 660, the base station 602 may stop using the repeater 606 and may exchange communication directly with the UE 604, as shown at 640.

Figure 7:
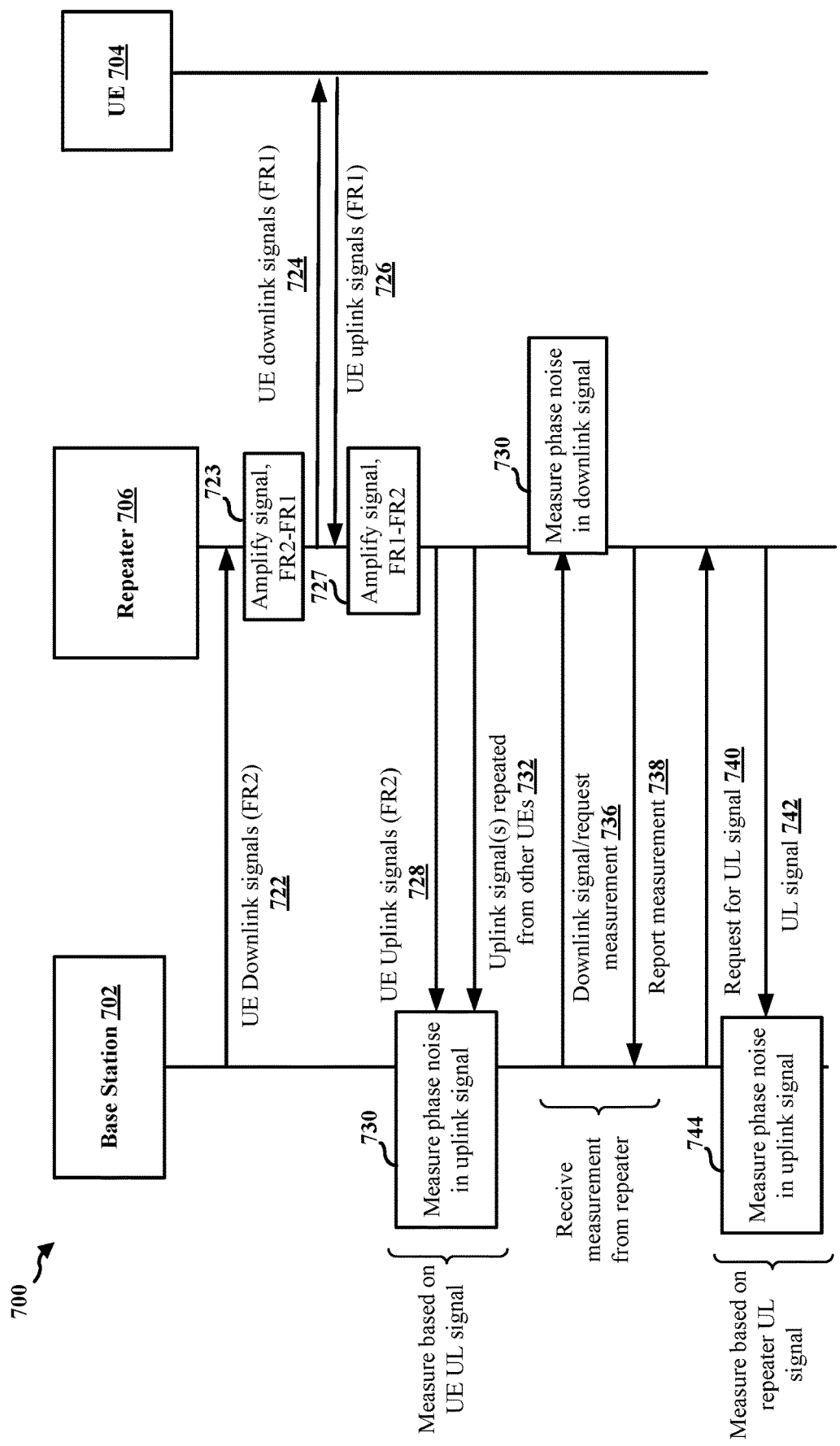
FIG. 7 is a communication flow between a base station, a repeater, and a UE, in accordance with aspects presented herein.

The base station may determine the level of the phase noise, e.g., at 613, in any of various ways. FIG. 7 illustrates an example communication flow 700 between a first wireless device and a second wireless device with an amplify and forward repeater 706. The example in FIG. 7 illustrates an example for a base station 702 and a UE 704, but the aspects may be similarly applied for repetitions between a UE and UE, an IAB node and UE, an RSU and UE. Similarly, the aspects performed by the base station 702 may be performed by a UE, an IAB node, an RSU, or another wireless device. FIG. 7 illustrates an example communication flow 700 between a base station 702, a repeater 706, and a UE 704, including various ways for a base station 702 to determine a phase noise level. The repeater 706 may amplify and frequency shift, at 723, the downlink signal 722 before transmission to the UE 704 at 724. The repeater 706 may amplify and frequency shift, at 727, the uplink signal (e.g., the uplink transmission 726) before forwarding to the base station at 728. FIG. 5 illustrates example aspects of the frequency shift. The aspects of FIG. 7 may be performed in combination with any of the aspects of FIG. 6 and/or FIG. 5. In some aspects, the base station 702 may use an uplink signal sent by the UE 704 (in FR1) as forwarded by the repeater 706 on FR2 after frequency shifting, at 727. The base station 602 may measure, at 730, the phase distortion of the received signal (e.g., 728). The base station 702 may measure a constant phase offset and a change in the phase offset over time. As an example, the uplink signal 728 may be scheduled or configured by the base station 702. For example, the base station 702 may have sent a downlink control signal to the UE 704 at 722 that scheduled the uplink signal transmission (e.g., uplink transmission 726) and/or configured one or more parameter of the uplink transmission 726. The downlink control signaling may pass through the same repeater 706 and be sent over FR2 on the fronthaul and down-converted to FR1 by the repeater 706 before transmission to the UE at 724. The transmission of downlink control signaling to the UE 704 may work, e.g., if the phase noise level is sufficiently low to allow the UE 704 to successfully receive and apply the downlink control signaling (e.g., with low MCS). In some aspects, the phase noise measurement, e.g., at 730, may be performed during an initial access procedure. For example, the base station may measure a phase noise in a random access channel (RACH) Msg1 or a Msg3 of a random access procedure. As an example, In some aspects, the source of phase noise may not be the FR1 transmission from the UE, but may be due to the FR2 components at the base station 702 and the repeater 706. The base station may learn the phase noise level over time, e.g., based on uplink signals from multiple UEs via the repeater, e.g., signal(s) 732 forwarded by the repeater for other UEs that are not illustrated. For example, as the phase noise is introduced in the signal between the repeater and the base station, each uplink signal may include similar phase noise levels even through the signals are with different UEs. The base station 702 may use the measurement of the phase noise in the UE's uplink signal to determine whether a phase noise threshold has been exceeded, e.g., at 613, in FIG. 6, which may trigger any of the adjustments described in connection with FIG. 6.

In other aspects, the phase noise may be measured based on base station-repeater communication. As an example, the base station 702 may can transmit a downlink signal 736 in FR2 to the repeater 706, and may request the repeater 706 to report a phase noise measurement based on the downlink signal. The request may be included in the downlink signal 736 or may be transmitted in a separate message, e.g., to the MT of the repeater 706. The repeater may perform one or more measurements associated with phase noise, in response to the request. For example, the repeater 706 may estimate a common phase error (CPE) and/or a variation of CPE over time based on the downlink signal from the base station 702. The repeater 706 may report the measured phase noise, or CPE, to the base station 702, at 738. The base station 702 may use the report from the repeater to determine whether a phase noise threshold has been exceeded, e.g., at 613, in FIG. 6, which may trigger any of the adjustments described in connection with FIG. 6.

In some aspects, the base station 702 may indicate the threshold to the repeater, e.g., in the request (e.g., in downlink signal 736) or in other control signaling. The repeater 706 may measure the phase noise in the downlink signal, at 730, and may transmit the report for the measurement in response to a measurement that exceeds the threshold indicated by the base station. The use of the threshold by the repeater may reduce the amount of signaling between the repeater and the base station, e.g., with reports of a phase noise that does not exceed the threshold, and may enable the repeater to send targeted reports when a phase noise is to be addressed by the base station.

As another example, the base station 702 may can transmit a request 740 to the repeater 706 to transmit an uplink signal 742 for measurement of phase noise. The base station 702 may measure, at 744, the uplink signal 742 from the repeater (e.g., in contrast to the UE uplink signal forwarded by the repeater at 728) to measure the phase noise. The base station 702 may use the measurement of the phase noise in the repeaters uplink signal 742 to determine whether a phase noise threshold has been exceeded, e.g., at 613, in FIG. 6, which may trigger any of the adjustments described in connection with FIG. 6.

Figure 8:
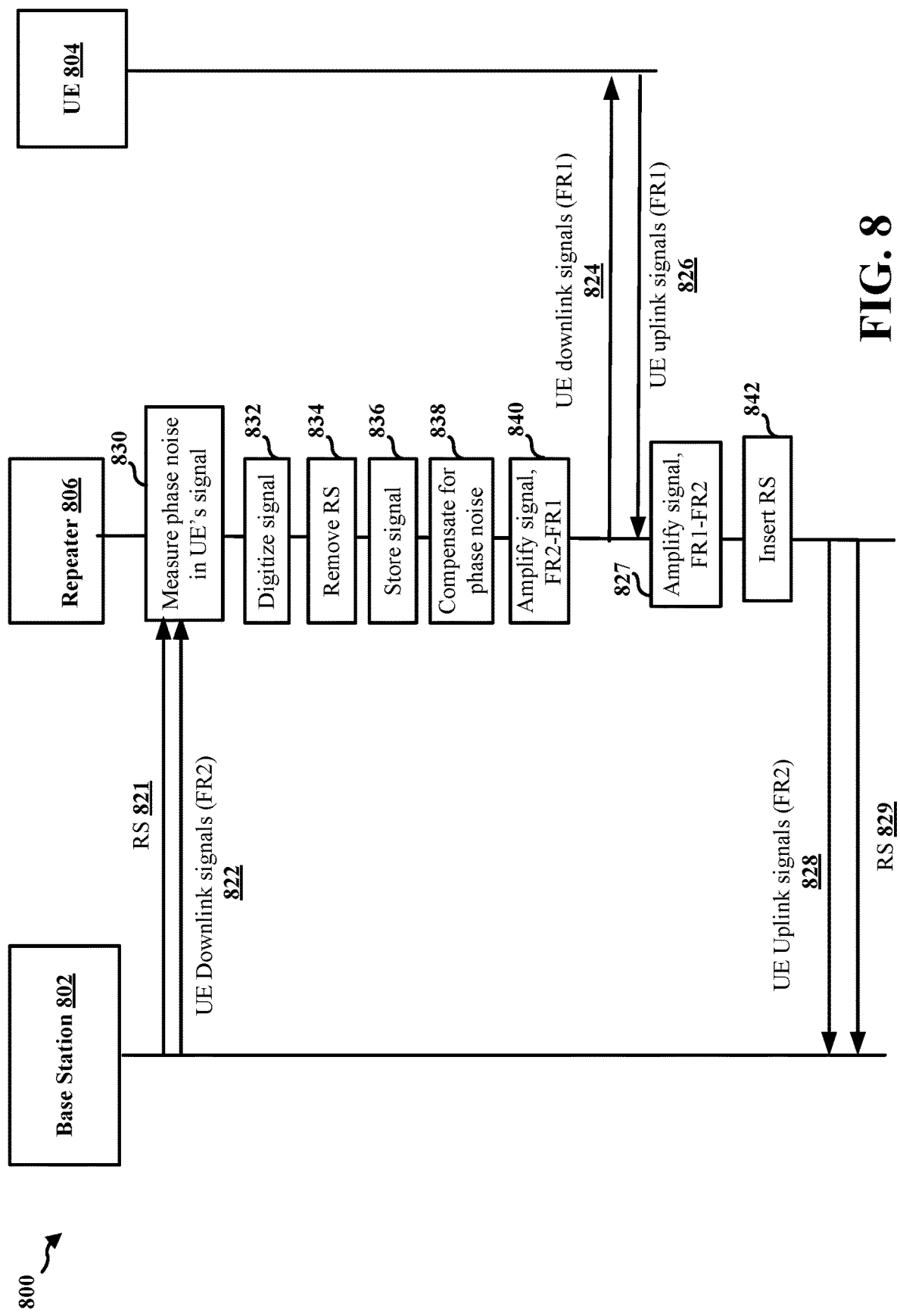
FIG. 8 is a communication flow between a base station, a repeater, and a UE, in accordance with aspects presented herein.

In some aspects, the repeater may apply phase noise compensation when amplifying and forwarding the signal. FIG. 8 illustrates an example communication flow 800 between a first wireless device and a second wireless device with an amplify and forward repeater 806. The example in FIG. 8 illustrates an example for a base station 802 and a UE 804, but the aspects may be similarly applied for repetitions between a UE and UE, an IAB node and UE, an RSU and UE. Similarly, the aspects performed by the base station 802 may be performed by a UE, an IAB node, an RSU, or another wireless device. FIG. 8 illustrates an example communication flow 800 between a base station 802, a repeater 806, and a UE 804, including various ways for compensation for or correction of phase noise at the repeater 806. The repeater 806 may amplify and frequency shift, at 840, the downlink signal 822 before transmission to the UE 804 at 824. The repeater 806 may amplify and frequency shift, at 827, the uplink signal 826 before forwarding to the base station at 828. FIG. 5 illustrates example aspects of the frequency shift. The aspects of FIG. 8 may be performed in combination with any of the aspects of FIG. 6 and/or FIG. 5. The repeater 806 may support phase noise estimation, e.g., at 830, and at least partial compensation or correction of phase noise, e.g., at 838. In some aspects, the repeater may support digital processing of the UE's downlink and uplink signals. In some aspects, the repeater may be referred to as a digital repeater.

On the downlink, the repeater receives the signal 822 from the base station 802 intended for the UE 804. The repeater 806 digitizes the signal, at 832, and stores the digitized signal in a local buffer, at 836. The repeater 806 adjusts the signal 822, at 838, to compensate for an estimated phase noise, e.g., measured at 830, before forwarding the UE's signal to the UE 804, at 824. For example, the repeater 806 may forward the UE's downlink signal 824 in a slot after the phase noise estimation and compensation. In some aspects, the slot may be a first slot after the phase noise estimation. In some aspects, the slot may be 2 or more slots after the phase noise estimation and compensation. To compensate for the phase noise (e.g., compensation), at 838, the repeater 806 at least partially removes the CPE across the symbols of the UE signal. The repeater 806 may subtract or remove the estimated phase noise from the signal.

The repeater 806 may acquire an estimation of the phase noise (PN) in any of various ways. In some aspects, the repeater 806 may measure CPE on the UE's signal, e.g., based on the downlink signal 822 for the UE 804. In some aspects, the repeater may use the UE's downlink signal, e.g., using a reference signal or pilot signal such as downlink DMRS, sent along with the UE's data or control channel to estimate CPE, at 830. In some aspects, the repeater 806 may use a cyclic prefix (CP) of the downlink symbols of the UE's downlink signal 822 to measure the phase noise or CPE, at 830.

In some aspects, the base station 802 may send an additional reference signal to the repeater 806 to facilitate the phase noise estimate, at 830. As an example, the additional reference signal may include a PTRS, or an additional DMRS, for the repeater. In some aspects, the base station 802 may transmit the reference signal separately, e.g., at 821, from the downlink signal 822 for the UE. In other aspects, the additional reference signal for the phase noise estimation at the repeater may be multiplexed with the downlink signal 822 for the UE.

Figure 9B:
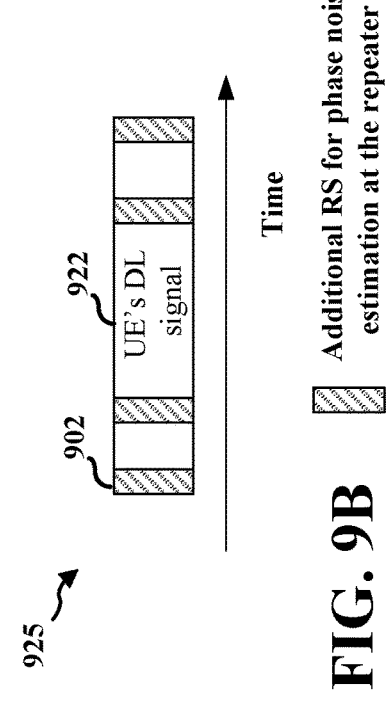
FIGS. 9A, 9B, 9C, and 9D illustrate various aspects of an additional reference signal multiplexed with a UE signal, in accordance with aspects presented herein.
Figure 9D:
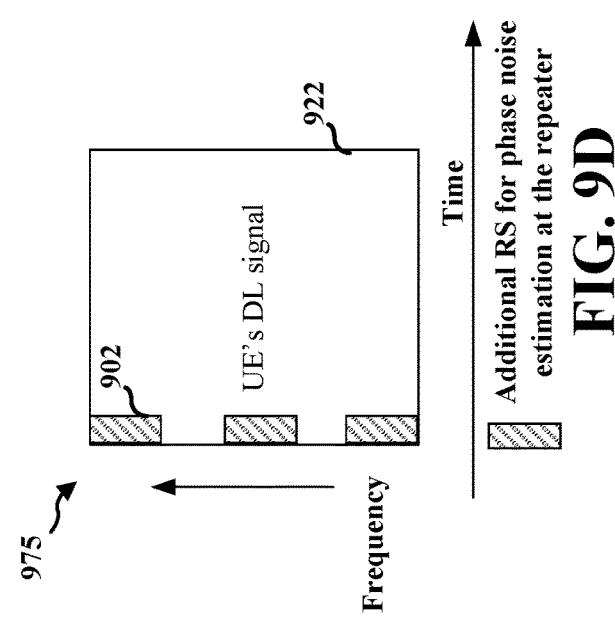
Figure 9A:
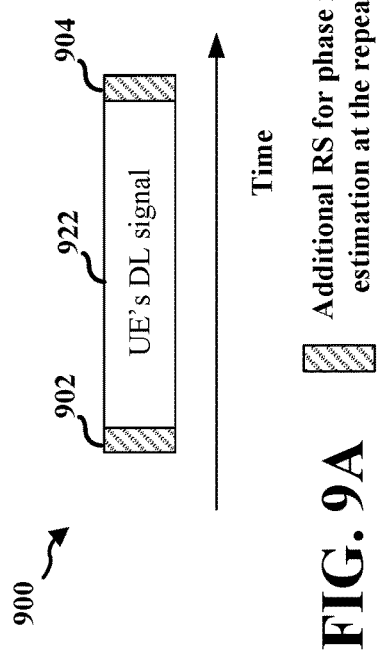

For example, the additional reference signal may be time division multiplexed (TDMed) with UE's signal 822. In some aspects, the additional reference signal may be included at the beginning and/or end of the UE's signal 822. FIG. 9A illustrates an example 900 in which the additional reference signal (e.g., 902 and 904) is included at the beginning and end of the time resources of the UE's downlink signal 922 (e.g., 822). In some aspects, the additional reference signal(s) 902 may be interleaved in time with the UE's downlink signal 822. FIG. 9B illustrates an example 925 in which the additional reference signal is interleaved in the time resources of the UE's downlink signal 922 (e.g., 822).

Figure 9C:
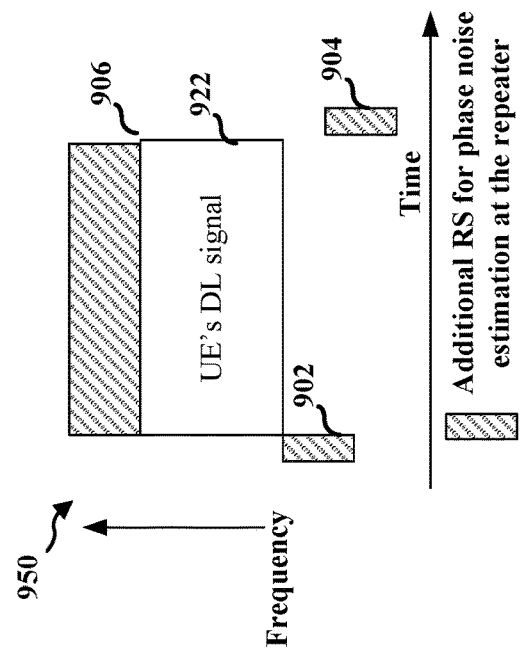

Additionally, or alternatively, the additional reference signal(s) may be frequency division multiplied (FDMed) with UE's signal 922 (e.g., 822) and sent on separate RBs not occupied by the UE's downlink signal 922. FIG. 9C illustrates an example 950 in which the additional reference signal (902, 904, and/or 906) is included at additional frequency resources than the frequency resources of the UE's downlink signal 922 (e.g., 822). The reference signal may overlap, at least partially, in time with the UE's downlink signal 922, e.g., as shown for the reference signal 906. The reference signal may be in time resources before and after the downlink signal 922, e.g., as shown for 902 and 904. The frequency resources may be adjacent to, or contiguous with the UE's downlink signal, as shown for 902 and 906, or may be non-contiguous with the UE's downlink signal, as shown for 904. In some aspects, the additional reference signal(s) may be interleaved in frequency with the UE's downlink signal 822. FIG. 9D illustrates an example 975 in which the additional reference signal 902 is interleaved in frequency with the resources of the UE's downlink signal 922 (e.g., 822).

In some aspects, the repeater 806 may extract the additional reference signal, at 834, and may not forward the additional reference signals to the UE 804 in the downlink signal 824. The repeater extracts, processes these signals, and may not forward them to the UE. FIG. 10A illustrates an example time diagram 1000 illustrating a UE's downlink signal 1022 (e.g., 822) that is transmitted by a base station to a repeater for forwarding to a UE, and which includes additional reference signals 1002 and 1004 for phase estimation at the repeater. FIG. 10A also shows the UE's downlink signal 1024 (e.g., 824) transmitted by the repeater to the UE without the additional reference signal.

The inclusion of the additional reference signal may enable the repeater to compensate for the phase noise of an individual transmission, e.g., whereas the example in FIG. 6 may be based on longer measurements, e.g., average phase noise measurements or estimates over time or change in phase noise measurements over time.

In some aspects, the repeater 806 may transmit an additional reference signal to the base station 802 to enable the base station to measure phase noise in the UE's uplink transmission 828. The repeater 806 may insert the reference signal, at 842. The additional reference signal may be in a separate transmission, as shown at 829, or may be multiplexed with the uplink transmission 828. The additional reference signal may be TDMed and/or FDMed with the uplink transmission 828, e.g., as illustrated for the downlink example in FIGS. 9A-9D. FIG. 10B illustrates an example time diagram 1050 illustrating a UE's uplink signal 1026 (e.g., 826) that is transmitted by a UE to a repeater for forwarding to a base station, and the inclusion by the repeater of additional reference signals 1002 and 1004, for phase estimation at the base station, with the UE's uplink signal 1028 transmitted by the repeater to the base station.

FIG. 11A is a flowchart 1100 of a method of wireless communication. The method may be performed by a first wireless device (e.g., the apparatus 1202). In some aspects, the method may be performed by a base station (e.g., the base station 102/180, 310, 410, 502, 602, 702, 802). In some aspects, the method may be performed by a UE (e.g., the UE 104, 350). In some aspects, the method may be performed by another wireless device, such as an IAB node 111, an RSU 107, etc. The method may enable adjustment for phase noise in signaling between wireless device and an out-of-band repeater.

At 1102, the first wireless device transmits one or more transmissions for a second wireless device to a repeater for repetition to the second wireless device. In some aspects, the first wireless device may be a base station, and the second wireless device may be a UE. In some aspects, the first wireless device may be a UE and the second wireless device may be a base station. In some aspects, the first wireless device may be a UE and the second wireless device may be a UE. For example, FIG. 5-8 illustrate examples of a base station (as a non-limiting example of a first wireless device) transmitting a downlink signal for a second wireless device to a repeater. A UE may similarly transmit an uplink signal to the repeater for repetition to a base station. The transmission may be performed, e.g., by the transmission component 1234 of the apparatus 1202 in FIG. 12.

At 1104, the first wireless device adjusts a repeater operation based on a phase noise in transmission between the first wireless device and the repeater. The adjustment may be performed, e.g., by the repeater control component 1244 of the apparatus 1202 in FIG. 12. FIG. 6 illustrates various aspects and options that the base station may apply to adjust a repeater operation based on a phase noise. For example, the first wireless device may stop communication to the second wireless device via the repeater or transmitting the communication to the second wireless device via a different repeater. As another example, the first wireless device may configure the repeater with a frequency shifting configuration. FIG. 7 illustrates various ways that the first wireless device may measure or obtain the phase noise.

At 1106, the first wireless device communicates with at least one of the repeater or the second wireless device based on the adjusted repeater operation. The communication may include the transmission of signals to the repeater for repetition to the second wireless device based on a change in a frequency shifting configuration as the adjusted repeater operation. The communication may include a direct transmission to the second wireless device without repetition. The communication may be performed, e.g., by the transmission component, e.g., by the transmission component 1234 and/or the reception component 1230.

FIG. 11B illustrates an example flowchart of a method 1150 of wireless communication that may include 1102, 1104, and 1106 of FIG. 11A. The method may be performed by a first wireless device (e.g., the apparatus 1202). In some aspects, the method may be performed by a base station (e.g., the base station 102/180, 310, 410, 502, 602, 702, 802). In some aspects, the method may be performed by a UE (e.g., the UE 104, 350). In some aspects, the method may be performed by another wireless device, such as an IAB node 111, an RSU 107, etc.

As illustrated at 1101, the first wireless device may receive from the repeater, an indication that the repeater supports the frequency shifting configuration prior to the first wireless device configuring the repeater. The reception may be performed, e.g., by the repeater capability component 1248 of the apparatus 1202 in FIG. 12. The first wireless device may change a configuration of the repeater based on the receipt of the indication that the repeater supports the configuration change.

As illustrated at 1103, the first wireless device may receive, from the repeater, a repeated signal transmission from the second wireless device. For example, FIG. 5-8 illustrate examples of a base station (e.g., as a non-limiting example of a first wireless device) receiving an uplink signal from a UE (e.g., as a non-limiting example of a second wireless device) via a repeater. The reception may be performed, e.g., by the reception component 1230 of the apparatus 1202.

As illustrated at 1110, the first wireless device may measure the phase noise in the transmission between the first wireless device and the repeater, where the first wireless device adjusts the repeater operation based on a measured phase noise being higher than a threshold. FIG. 7 illustrates various ways that the base station may measure or obtain the phase noise. As an example, the first wireless device may measure a change in a phase offset over time in the transmissions from the second wireless device. As an example, the first wireless device may receive multiple signals from the second wireless device that are repeated by the repeater and may measure the phase noise by measuring a change in phase offset over time in the multiple signals from the at least one second wireless device. The first wireless device may measure the change in the phase offset over the time for communication (e.g., multiple signals) from multiple other wireless devices (e.g., multiple UEs, in some aspects) communicating with the first wireless device.

As illustrated at 1126, the first wireless device may receive an indication of the phase noise from the repeater, wherein the first wireless device adjusts the repeater operation based on a measured phase noise being higher than a threshold. The reception may be performed, e.g., by the phase noise component 1250 of the apparatus 1202. In some aspects, the first wireless device may transmit a request for the repeater to report the phase noise, the indication being received in response to the request, at 1112. The request may be transmitted by the request component 1246 of the apparatus 1202 in FIG. 12. The request may indicate for the repeater to report the phase noise if the phase noise exceeds a phase noise threshold. In some aspects, the first wireless device may transmit an additional signal to the repeater, at 1124, with the one or more transmission for the repetition to the second wireless device, the additional signal including at least one of a DMRS, a PTRS, or an additional reference signal for the repeater. The additional signal may be multiplexed in at least one of time resources or frequency resources with a signal for the second wireless device. The multiplexing may include any of the aspects described in connection with FIG. 9A-D or 10A.

As illustrated, at 1108, the first wireless device may receive a reference signal (e.g., an additional reference signal) from the repeater, the reference signal multiplexed in the repetition of a signal from the first wireless device, wherein the phase noise is based the reference signal. The additional reference signal may include any of the aspects described in connection with FIGS. 8-10B. The reception may be performed by the reception component 1230, and measurement of the phase noise based on the reference signal may be performed, e.g., by the phase noise component 1250 of the apparatus 1202.

Figure 12:
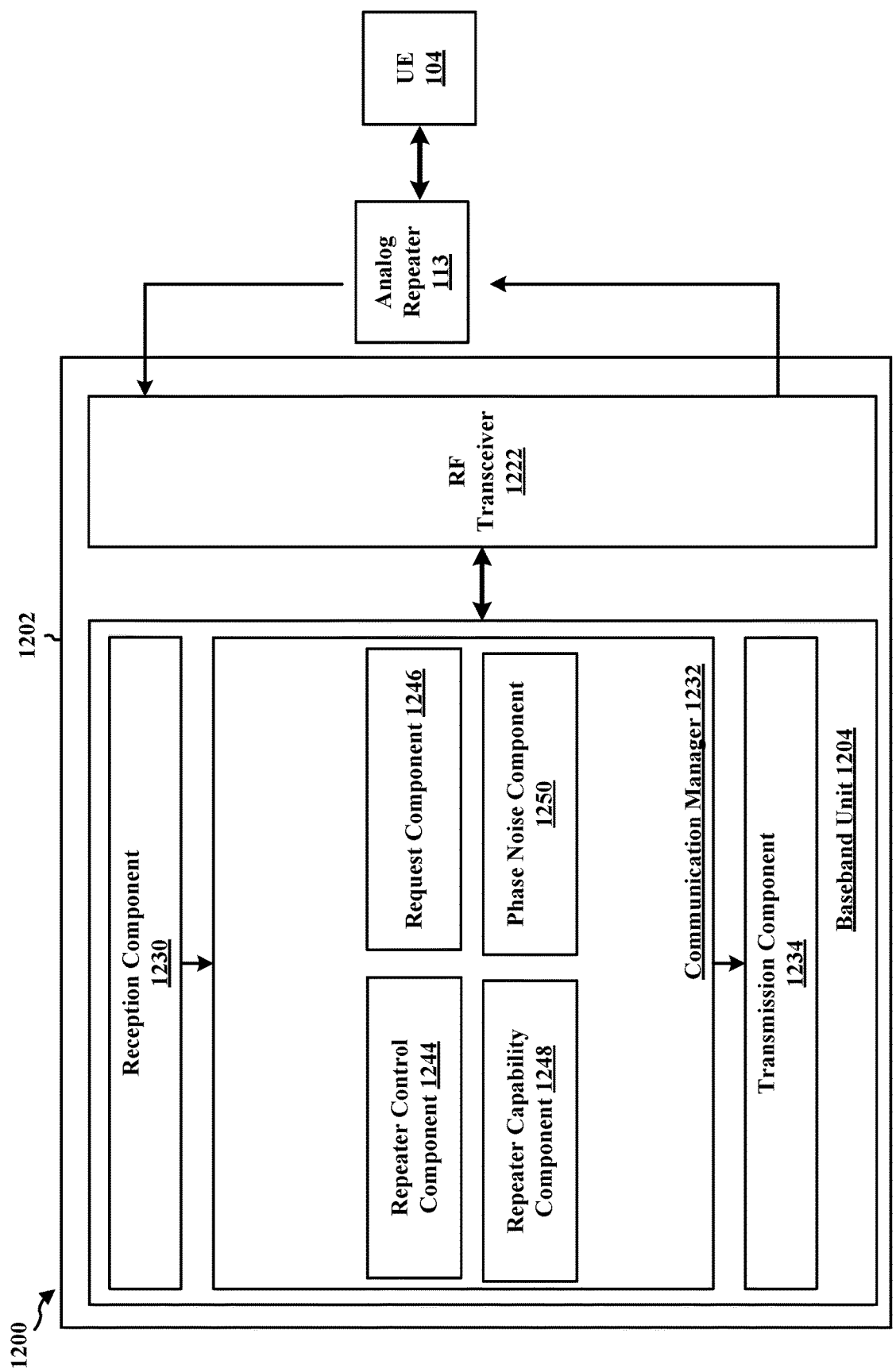
FIG. 12 is a diagram illustrating an example of a hardware implementation for an example apparatus, in accordance with aspects presented herein.

FIG. 12 is a diagram 1200 illustrating an example of a hardware implementation for an apparatus 1202. The apparatus 1202 may be a base station, a component of a base station, or may implement base station functionality. The apparatus may be a UE, a component of a UE, or may implement UE functionality. The apparatus may be another wireless device, such as an IAB node, and RSU, etc. In some aspects, the apparatus 1202 may include a baseband unit 1204. The baseband unit 1204 may communicate through a cellular RF transceiver 1222 with the UE 104. The baseband unit 1204 may include a computer-readable medium/ memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234.

The communication manager 1232 includes the one or more illustrated components. The components within the communication manager 1232 may be stored in the computer-readable medium/memory and/or configured as hardware within the baseband unit 1204. The baseband unit 1204 may be a component of a wireless device, (such as a base station 310 or UE 350) and may include the memory 376 and/or at least one of the TX processor 316, the RX processor 370, and the controller/processor 375.

The communication manager 1232 includes a transmission component 1234 that transmits transmission(s) for a second wireless device to a repeater, e.g., as described in connection with 1102 in FIG. 11A or 11B. The communication manager 1232 further includes a reception component 1230 that receives, from the repeater, an uplink repetition of one or more uplink transmissions from the second wireless device, e.g., as described in connection with 1104 in FIG. 11A or 11B. The communication manager 1232 further includes a repeater control component 1244 that adjusts a repeater operation based on a phase noise in transmission between the first wireless device and the repeater, e.g., as described in connection with 1106 in FIG. 11A or 11B. The communication manager 1232 further includes a request component 1246 that transmits a request for the repeater to report a phase noise, e.g., as described in connection with 1122 in FIG. 11B. The communication manager 1232 further includes a repeater capability component 1248 that receives, from the repeater, an indication that the repeater supports the frequency shifting configuration prior to configuring the repeater, e.g., as described in connection with 1101 in FIG. 11B. The communication manager 1232 further includes a phase noise component 1250 that measures the phase noise in the transmission between the first wireless device and the repeater or receives an indication of the phase noise from the repeater, e.g., as described in connection with 1108, 1110 or 1126 in FIG. 11B.

The apparatus may include additional components that perform each of the blocks of the algorithm in the flowchart of FIG. 11A or 11B, and/or any of the aspects performed by the base station (as a non-limiting example of a first wireless device) in FIG. 4A, 5, 6, 7, or 8. As such, each block in the flowchart of FIG. 11A or 11B, and/or any of the aspects performed by the base station (as a non-limiting example of a first wireless device) in FIG. 4A, 5, 6, 7, or 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for transmitting one or more transmissions for a second wireless device to a repeater for repetition to the second wireless device; means for receiving, from the repeater, an uplink repetition of one or more uplink transmissions from the second wireless device; and means for adjusting a repeater operation based on a phase noise in transmission between the first wireless device and the repeater. The apparatus 1202 may further include means for measuring the phase noise in the transmission between the first wireless device and the repeater, wherein the first wireless device adjusts the repeater operation based on a measured phase noise being higher than a threshold. The apparatus 1202 may further include means for receiving an indication of the phase noise from the repeater, wherein the first wireless device adjusts the repeater operation based on a measured phase noise being higher than a threshold. The apparatus 1202 may further include means for transmitting a request for the repeater to report the phase noise, the indication being received in response to the request. The apparatus 1202 may further include means for transmitting an additional signal to the repeater with the one or more transmission for the repetition to the second wireless device, the additional signal including at least one of a demodulation reference signal (DMRS), a phase tracking reference signal (PTRS), or an additional reference signal for the repeater. The apparatus 1202 may further include means for receiving reference signal from the repeater, the reference signal multiplexed in the repetition of the one or more uplink transmission, wherein the phase noise is based the reference signal. The means may be one or more of the components of the apparatus 1202 configured to perform the functions recited by the means. As described supra, the apparatus 1202 may include the TX processor 316, the RX processor 370, and the controller/processor 375. As such, in one configuration, the means may be the TX processor 316, the RX processor 370, and the controller/processor 375 configured to perform the functions recited by the means.

Figure 13:
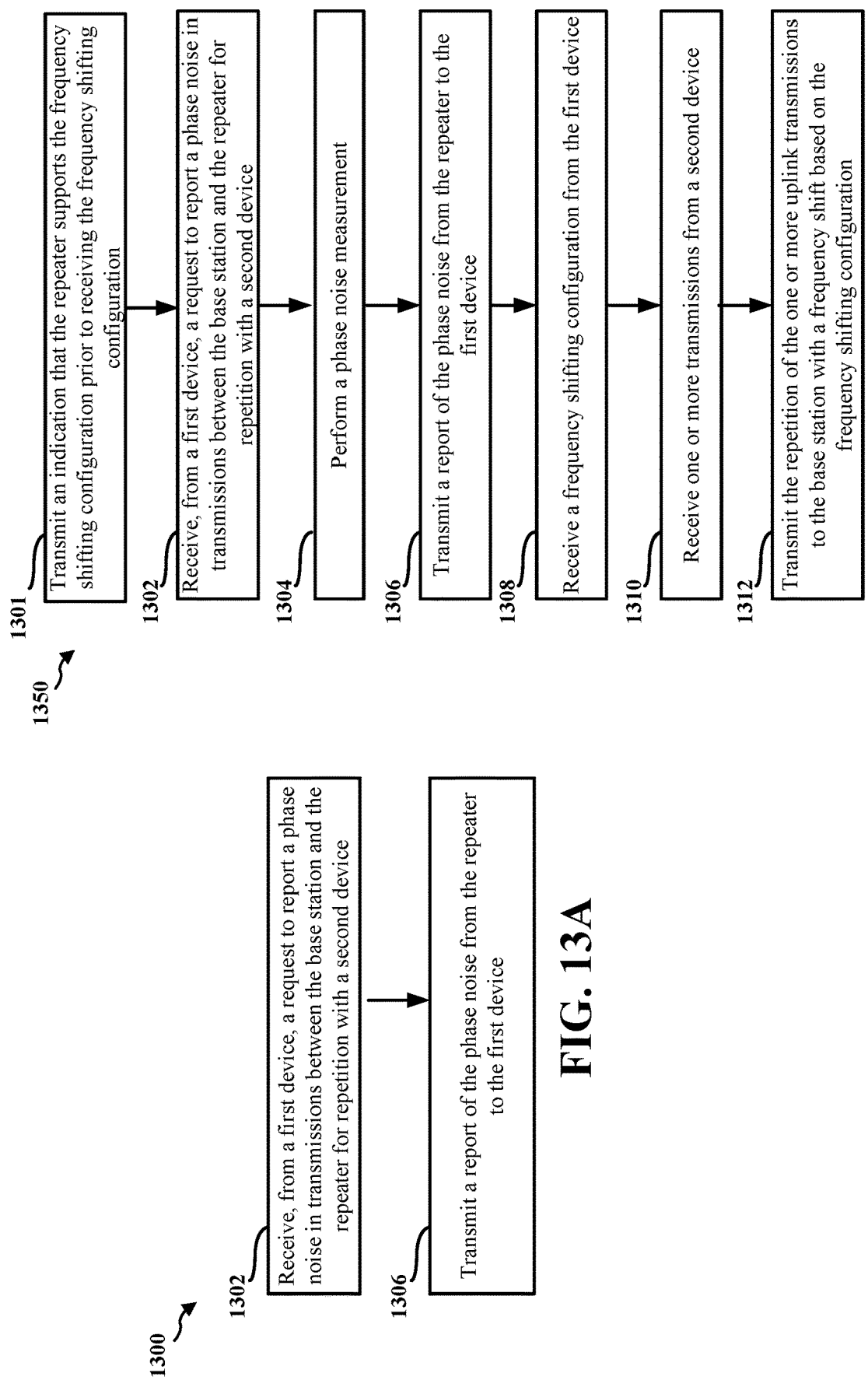
FIGS. 13A and 13B are flowchart of a method of wireless communication at a repeater, in accordance with aspects presented herein.

FIG. 13A is a flowchart 1300 of a method of wireless communication. The method may be performed by a repeater (e.g., 113, 420, 506, 606, 706, 806; the apparatus 1502. The method may enable adjustment for phase noise in signaling between a first wireless device and an out-of-band repeater.

At 1302, the repeater receives from a first wireless device, a request for the repeater to report a phase noise in transmissions between the first wireless device and the repeater for repetition with at least one second wireless device. In some aspects, the first wireless device may be a base station, and the second wireless device may be a UE. In some aspects, the first wireless device may be a UE and the second wireless device may be a base station. In some aspects, the first wireless device may be a UE and the second wireless device may be a UE. The request may indicate for the repeater to report the phase noise if the phase noise exceeds a phase noise threshold, the report being transmitted based on the phase noise exceeding the phase noise threshold. FIG. 7 illustrates an example of a repeater receiving a request from a first wireless device. The request may be received, e.g., by the request component 1546 of the apparatus 1502 in FIG. 15.

At 1306, the repeater transmits a report of the phase noise to the first wireless device based on the request. FIG. 7 illustrates an example of a repeater transmitting a report of the phase noise to the first wireless device. The transmission may be performed, e.g., by the phase noise component 1550 of the apparatus 1502 in FIG. 15.

FIG. 13B illustrates a method 1350 of wireless communication that may include 1302 and 1306 from FIG. 13A. As illustrated at 1308, the repeater may receive a frequency shifting configuration from the first wireless device. FIG. 6 illustrates an example of a repeater receiving a change of a configuration for frequency shifting, e.g., at 650. In some aspects, the first wireless device may be a base station, and the second wireless device may be a UE. In some aspects, the first wireless device may be a UE and the second wireless device may be a base station. In some aspects, the first wireless device may be a UE and the second wireless device may be a UE.

At 1310, the repeater may receive one or more transmissions from a second wireless device, and at 1312, when transmitting the repetition of the one or more uplink transmissions to the first wireless device with a frequency shift based on the frequency shifting configuration. The uplink transmissions may be received and transmitted by the transmission component 1534 the apparatus 1502.

In some aspects, the repeater may transmit, to the first wireless device, an indication that the repeater supports the frequency shifting configuration prior to receiving the frequency shifting configuration, at 1301. FIG. 6 illustrates an example of a UE (e.g., as a non-limiting example of a second wireless device) providing the indication to the first wireless device. The transmission may be performed, e.g., by the repeater capability component 1548 of the apparatus 1502.

In some aspects, at 1304, the repeater may measure the phase noise based on the signal for the second wireless device. In some aspects, at 1304, the repeater may measure the phase noise based on an additional signal to the repeater with one or more transmissions for repetition to the second wireless device. The additional signal may include at least one of a DMRS for the repeater, a PTRS, or an additional reference signal for the repeater. The additional signals may be multiplexed in at least one of time resources or frequency resources with a signal for the second wireless device. FIGS. 9A-9D and 10A illustrate various aspects of an additional signal that the repeater may receive to measure phase noise.

In some aspects, the repetition of the one or more transmissions from the second wireless device that is transmitted at 1312, may include an additional signal from the repeater. The additional signal may include at least one of a DMRS for the first wireless device, a PTRS, or an additional reference signal for the first wireless device, the additional signal being multiplexed in at least one of time resources or frequency resources with a signal from the second wireless device. FIGS. 10A and 10B illustrate various aspects of transmitting an additional signal to a first wireless device. The transmission may be performed, e.g., by the transmission component 1534 of the apparatus 1502.

Figure 14:
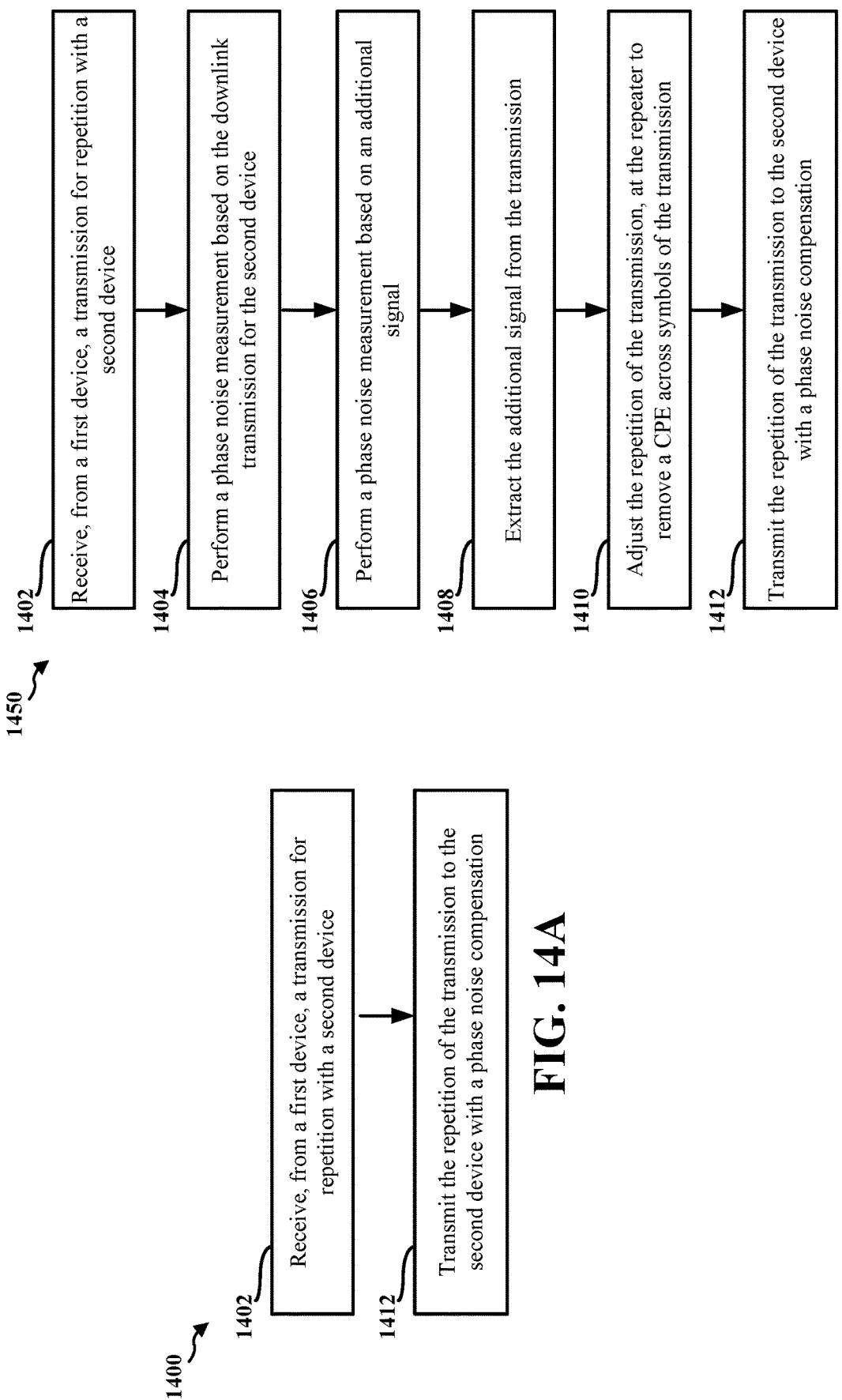
FIGS. 14A and 14B are flowchart of a method of wireless communication at a repeater, in accordance with aspects presented herein.

FIG. 14A is a flowchart 1400 of a method of wireless communication. The method may be performed by a repeater (e.g., 113, 420, 506, 606, 706, 806; the apparatus 1502. The method may enable adjustment for phase noise in signaling between a wireless device and an out-of-band repeater.

At 1402, the repeater receives, from a first wireless device, a transmission for repetition with at least one second wireless device. In some aspects, the first wireless device may be a base station, and the second wireless device may be a UE. In some aspects, the first wireless device may be a UE and the second wireless device may be a base station. In some aspects, the first wireless device may be a UE and the second wireless device may be a UE. FIGS. 4A-10A illustrates various aspects of a repeater receiving transmissions for a UE (e.g., as a non-limiting example of a second wireless device). The reception may be performed, e.g., by the reception component 1530 of the apparatus 1502 in FIG. 15.

At 1404, the repeater transmits the repetition of the transmission to the at least one second wireless device with a phase noise compensation. FIG. 8 illustrates various aspects of phase noise measurement and compensation that may be applied by the UE. The transmission may be performed, e.g., by the transmission component 1534 of the apparatus 1502 in FIG. 15 with compensation applied by the compensation component 1544.

FIG. 14B illustrates an example flowchart of a method 1450 of wireless communication that may include 1402 and 1412 of FIG. 14A. As illustrated at 1410, the repeater may further adjust the repetition of the transmission, at the repeater to remove a CPE across symbols of the transmission before transmitting the repetition to the second wireless device. FIG. 8 illustrates various aspects of a repeater compensating for phase noise. The compensation may be performed, e.g., by the compensation component 1544 of the apparatus 1502.

As illustrated at 1404, the repeater may perform a phase noise measurement based on the transmission for the second wireless device. The phase noise measurement may be based on at least one of a DMRS or a cyclic prefix of the transmission for the second wireless device. Various aspects of phase noise measurement are described in connection with FIG. 8. The measurement may be performed, e.g., by the phase noise component 1550 of the apparatus 1502 in FIG. 15.

As illustrated at 1406, the repeater may perform a phase noise measurement based on an additional signal received from the first wireless device with the transmission for the repetition to the second wireless device. Various aspects of phase noise measurement based on an additional signal are described in connection with FIG. 8-10A. The additional signal may include at least one of a DMRS for the repeater, a PTRS, or an additional reference signal for the repeater. The additional signal may be multiplexed in at least one of time resources or frequency resources with a signal for the second wireless device. FIGS. 9A-9D illustrate various examples of multiplexing the additional signal with the signal for the UE. The measurement may be performed, e.g., by the phase noise component 1550 of the apparatus 1502 in FIG. 15.

As illustrated at 1408, the repeater may extract the additional signal from the transmission prior to transmitting the repetition of the transmission to the second wireless device. FIG. 10A illustrates an example of a repeater extracting the additional reference signal. The extraction may be performed, e.g., by the transmission component 1534 of the apparatus 1502.

Figure 15:
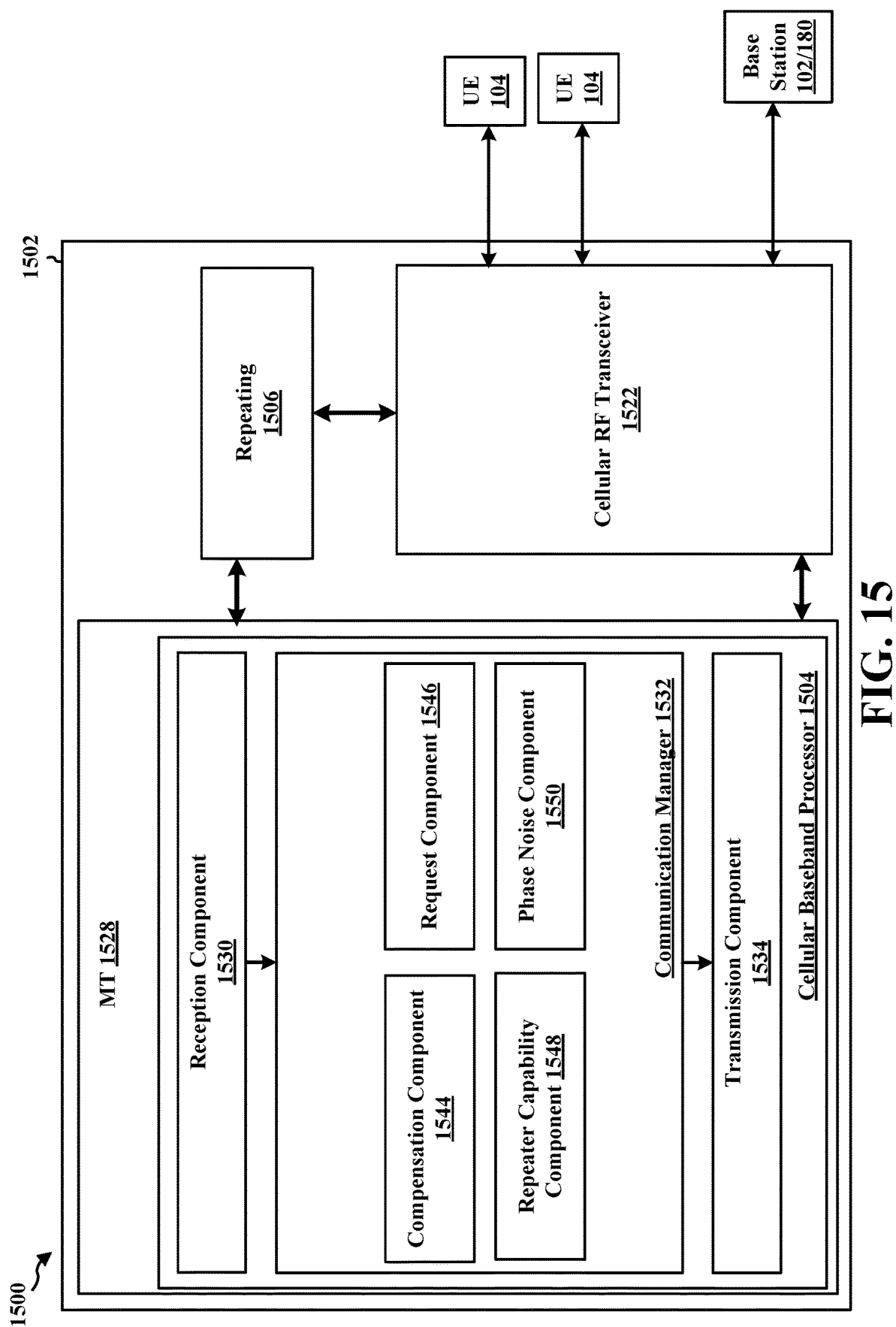
FIG. 15 is a diagram illustrating an example of a hardware implementation for an example apparatus, in accordance with aspects presented herein.

FIG. 15 is a diagram 1500 illustrating an example of a hardware implementation for an apparatus 1502. The apparatus 1502 may be a repeater, a component of a repeater, or may implement repeater functionality. In some aspects, the apparatus 1502 may include a baseband unit 1504 in an MT component 1528. The apparatus 1502 may include a repeating unit 1506 that is configured to repeat communication, e.g., based on an amplify and forward operation, e.g., as described in connection with any of FIGS. 4A-10B. The MT component 1528 may receive control signaling, other information, reference signals, and communication from a base station 102/180, or from a UE 104. The repeating unit 1506 may repeat (e.g., amplify and forward) downlink and uplink signals between the UE 104 and the base station 102/180, e.g., based on control received by the MT component 1528. The baseband unit 1504 may communicate through a cellular RF transceiver 1522 with a control node, such as a base station 102/180. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the repeater 113 and may include the memory 376 and/or at least one of the TX processor 316, the RX processor 370, and the controller/processor 375.

The apparatus 1502 includes a reception component 1530 that is configured to receive from a first wireless device, a transmission for repetition with at least one second wireless device, e.g., as described in connection with 1402 in FIGS. 14A and 14B. The apparatus 1502 further includes a transmission component 1534 that transmits the repetition of the one or more uplink transmissions to the first wireless device with a frequency shift based on the frequency shifting configuration, e.g., as described in connection with 1312 in FIG. 13B, or that extracts the additional signal from the transmission, e.g., as in 1408. The apparatus 1502 further includes a compensation component 1544 that adjusts the repetition of the transmission, at the repeater to remove a CPE across symbols of the transmission, e.g., as described in connection with 1410 and/or transmits the repetition of the transmission to the at least one second wireless device with a phase noise compensation, e.g., as described in connection with 1412. The apparatus 1502 further includes a request component 1546 that receives, from a first wireless device, a request to report a phase noise in transmissions between the first wireless device and the repeater for repetition with at least one second wireless device, e.g., as described in connection with 1302 in FIG. 13A or 13B. The apparatus 1502 further includes a repeater capability component 1548 that transmits an indication that the repeater supports the frequency shifting configuration prior to receiving the frequency shifting configuration, e.g., as described in connection with 1301 in FIG. 13B. The apparatus 1502 further includes a phase noise component 1550 that performs a phase noise measurement, e.g., as described in connection with any of 1304, 1404, or 1406, or that is configured to transmit a report of the phase noise from the repeater to the first wireless device, e.g., as in 1306.

The apparatus may include additional components that perform each of the blocks of the algorithm in the flowcharts of FIGS. 13A, 13B and/or 14A or 14B, and any of the aspects performed by the repeater in FIGS. 4A-10B. As such, each block in the flowcharts of FIGS. 13A, 13B, 14A and/or 14B, and any of the aspects performed by the repeater in FIGS. 4A-10B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, may include means for receiving, from a first wireless device, a request for the repeater to report a phase noise in transmissions between the first wireless device and the repeater for repetition with at least one second wireless device; and means for transmitting a report of the phase noise to the first wireless device based on the request. The apparatus 1502 may further include means for receiving a frequency shifting configuration from the first wireless device; means for receiving, from the first wireless device, one or more uplink transmissions from a second wireless device; and means for transmitting the repetition of the one or more uplink transmissions to the first wireless device with a frequency shift based on the frequency shifting configuration. The apparatus 1502 may further include means for transmitting, to the first wireless device, an indication that the repeater supports the frequency shifting configuration prior to receiving the frequency shifting configuration. The apparatus 1502 may further include means for measuring the phase noise based on an additional signal to the repeater with one or more transmissions for repetition to the second wireless device. The apparatus 1502 may further include means for transmitting, to the first wireless device, an uplink repetition of the one or more uplink transmissions from the second wireless device, the uplink repetition including an additional signal from the repeater. The apparatus 1402 may further include means for receiving, from a first wireless device, a transmission for repetition with at least one second wireless device; and means for transmitting the repetition of the transmission to the at least one second wireless device with a phase noise compensation. The apparatus 1402 may further include means for adjusting the repetition of the transmission, at the repeater to remove a common phase error (CPE) across symbols of the transmission before transmitting the repetition to the second wireless device. The apparatus 1402 may further include means for performing a phase noise measurement based on the transmission for the second wireless device. The apparatus 1402 may further include means for performing a phase noise measurement based on an additional signal received from the first wireless device with the transmission for the repetition to the second wireless device. The apparatus 1402 may further include means for extracting the additional signal from the transmission prior to transmitting the repetition of the transmission to the second wireless device. The means may be one or more of the components of the apparatus 1502 configured to perform the functions recited by the means. As described supra, the apparatus 1502 may include the TX processor 316, the RX processor 370, and the controller/processor 375. As such, in one configuration, the means may be the TX processor 316, the RX processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a first wireless device, comprising: transmitting one or more transmissions for a second wireless device to a repeater for repetition to the second wireless device; adjusting a repeater operation based on a phase noise in transmission between the first wireless device and the repeater; and communicating with at least one of the repeater or the second wireless device based on the adjusted repeater operation.

In aspect 2, the method of aspect 1 further includes that the first wireless device is a base station and the second wireless device is a UE.

In aspect 3, the method of aspect 1 further includes that the first wireless device is a first UE and the second wireless device is a second UE.

In aspect 4, the method of any of aspects 1-3 further includes that the adjusting the repeater operation includes at least one of stopping communication with the second wireless device via the repeater or communicating with the second wireless device via a different repeater.

In aspect 5, the method of any of aspects 1-3 further includes that the adjusting the repeater operation includes configuring the repeater with a frequency shifting configuration to shift a signal at the repeater from a first frequency to a second frequency.

In aspect 6, the method of any of aspect 5 further includes that receiving, from the repeater, an indication that the repeater supports the frequency shifting configuration prior to configuring the repeater.

In aspect 7, the method of any of aspects 1-6 further includes that measuring the phase noise in the transmission between the first wireless device and the repeater, wherein the first wireless device adjusts the repeater operation based on a measured phase noise being higher than a threshold.

In aspect 8, the method of aspect 7 further includes that receiving multiple signals from the second wireless device that are repeated by the repeater, wherein measuring the phase noise includes measuring a change in a phase offset over time in multiple signals from at least the second wireless device.

In aspect 9, the method of aspect 7 further includes that measuring the phase noise includes measuring the change in the phase offset over the time for the multiple signals from multiple other wireless devices communicating with the first wireless device.

In aspect 10, the method of any of aspects 1-9 further includes receiving an indication of the phase noise from the repeater, wherein the first wireless device adjusts the repeater operation based on a measured phase noise being higher than a threshold.

In aspect 11, the method of aspect 10 further includes transmitting a request for the repeater to report the phase noise, the indication being received in response to the request.

In aspect 12, the method of aspect 11 further includes that the request indicates for the repeater to report the phase noise if the phase noise exceeds a phase noise threshold.

In aspect 13, the method of any of aspects 1-12 further includes transmitting an additional signal to the repeater with the one or more transmissions for the repetition to the second wireless device, the additional signal including at least one of a DMRS, a PTRS, or an additional reference signal for the repeater, wherein the additional signal is multiplexed in at least one of time resources or frequency resources with a signal for the second wireless device.

In aspect 14, the method of any of aspects 1-13 further includes receiving a reference signal from the repeater, the reference signal multiplexed in the repetition of a signal from the second wireless device, wherein the phase noise is based the reference signal.

Aspect 15 is an apparatus for wireless communication comprising means to perform the method of any of aspects 1-14.

In aspect 16, the apparatus of aspect 15 further includes at least one of an antenna or a transceiver coupled to the at least one antenna and the means to perform the method of any of aspects 1-20.

Aspect 17 is an apparatus for wireless communication comprising memory and at least one processor coupled to the memory, the memory and the at least one processor configured to perform the method of any of aspects 1-14.

In aspect 18, the apparatus of aspect 17 further includes at least one of an antenna or a transceiver coupled to the at least one antenna and the at least one processor.

Aspect 19 is a non-transitory computer-readable storage medium storing computer executable code, the code when executed by a processor causes the processor to perform the method of any of aspects 1-14.

Aspect 20 is a method of wireless communication at a repeater, comprising: receiving, from a first wireless device, a request for the repeater to report a phase noise in transmissions between the first wireless device and the repeater for repetition with a second wireless device; and transmitting a report of the phase noise to the first wireless device based on the request.

In aspect 21, the method of aspect 20 further includes that the first wireless device is a base station and the second wireless device is a UE.

In aspect 22, the method of aspect 20 further includes that the first wireless device is a first UE and the second wireless device is a second UE.

In aspect 23, the method of any of aspects 20-23 further includes that the request indicates for the repeater to report the phase noise if the phase noise exceeds a phase noise threshold, the report being transmitted based on the phase noise exceeding the phase noise threshold.

In aspect 24, the method of any of aspects 20-23 further includes receiving a frequency shifting configuration from the first wireless device; receiving one or more signals from one of the first wireless device or the second wireless device; and transmitting the repetition of the one or more signals to the other of the first wireless device or the second wireless device with a frequency shift based on the frequency shifting configuration.

In aspect 25, the method of aspect 24 further includes transmitting, to the first wireless device, an indication that the repeater supports the frequency shifting configuration prior to receiving the frequency shifting configuration.

In aspect 26, the method of any of aspects 20-25 further includes measuring the phase noise based on an additional signal to the repeater with one or more transmissions for repetition to the at least one second wireless device.

In aspect 27, the method of aspect 26 further includes that the additional signal includes at least one of a DMRS for the repeater, a PTRS, or an additional reference signal for the repeater.

In aspect 28, the method of aspect 26 or 27 further includes that the additional signal is multiplexed in at least one of time resources or frequency resources with at least one transmission from the first wireless device for the second wireless device.

In aspect 29, the method of any of aspects 20-28 further includes transmitting, to the first wireless device, a signal repetition of the one or more signals from the second wireless device including an additional signal from the repeater, wherein the additional signal includes at least one of a DMRS for the first wireless device, a PTRS, or an additional reference signal for the first wireless device, the additional signal being multiplexed in at least one of time resources or frequency resources with a signal from the second wireless device.

Aspect 30 is an apparatus for wireless communication comprising means to perform the method of any of aspects 20-29.

In aspect 31, the apparatus of aspect 30 further includes at least one of an antenna or a transceiver coupled to the at least one antenna and the means to perform the method of any of aspects 20-29.

Aspect 32 is an apparatus for wireless communication comprising memory and at least one processor coupled to the memory, the at least one processor configured to perform the method of any of aspects 20-29.

In aspect 33, the apparatus of aspect 30 further includes at least one of an antenna or a transceiver coupled to the at least one antenna and the at least one processor.

Aspect 34 is a non-transitory computer-readable storage medium storing computer executable code, the code when executed by a processor causes the processor to perform the method of any of aspects 20-29.

Aspect 35 is a method of wireless communication at a repeater, comprising: receiving, from a first wireless device, a transmission for repetition with a second wireless device; and transmitting the repetition of the transmission to the second wireless device with a phase noise compensation.

In aspect 36, the method of aspect 35 further includes that the first wireless device is a base station and the second wireless device is a UE.

In aspect 37, the method of aspect 35 further includes that the first wireless device is a first UE and the second wireless device is a second UE.

In aspect 38, the method of any of aspects 35-37 further includes adjusting the repetition of the transmission, at the repeater to remove a CPE across symbols of the transmission before transmitting the repetition to the second wireless device.

In aspect 39, the method of aspect 38 further includes performing a phase noise measurement based on the transmission for the second wireless device.

In aspect 40, the method of aspect 38 or 39 further includes that the phase noise measurement is based on at least one of a DMRS or a cyclic prefix of the transmission for the second wireless device.

In aspect 41, the method of any of aspects 35-40 further includes performing a phase noise measurement based on an additional signal received from the first wireless device with the transmission for the repetition to the second wireless device, wherein the additional signal includes at least one of a demodulation reference signal (DMRS) for the repeater, a phase tracking reference signal (PTRS), or an additional reference signal for the repeater.

In aspect 42, the method of aspect 41 further includes that the additional signal is multiplexed in at least one of time resources or frequency resources with a signal for the second wireless device.

In aspect 43, the method of aspect 41 or 42 further includes extracting the additional signal from the transmission prior to transmitting the repetition of the transmission to the second wireless device.

Aspect 44 is an apparatus for wireless communication comprising means to perform the method of any of aspects 35-43.

In aspect 45, the apparatus of aspect 44 further includes at least one of an antenna or a transceiver coupled to the at least one antenna and the means to perform the method of any of aspects 35-43.

Aspect 46 is an apparatus for wireless communication comprising memory and at least one processor coupled to the memory, the at least one processor configured to perform the method of any of aspects 35-43.

In aspect 47, the apparatus of aspect 46 further includes at least one of an antenna or a transceiver coupled to the at least one antenna and the at least one processor.

Aspect 48 is a non-transitory computer-readable storage medium storing computer executable code, the code when executed by a processor causes the processor to perform the method of any of aspects 35-43.

What is claimed is:

1. An apparatus for wireless communication at a repeater, comprising:
    memory; and
    at least one processor coupled to the memory and configured to cause the repeater to:
        receive, from a first wireless device, a request for the repeater to report a phase noise in transmissions between the first wireless device and the repeater for repetition with a second wireless device; and
        transmit a report of the phase noise to the first wireless device based on the request.

2. The apparatus of claim 1, further comprising:
    at least one of an antenna or a transceiver coupled to the at least one processor.

3. The apparatus of claim 1, wherein the request indicates for the repeater to report the phase noise if the phase noise exceeds a phase noise threshold, the report being based on the phase noise exceeding the phase noise threshold.

4. The apparatus of claim 1, wherein the at least one processor is further configured to cause the repeater to:
    receive a frequency shifting configuration from the first wireless device;
    receive one or more signals from one of the first wireless device or the second wireless device; and
    transmit the repetition of the one or more signals to another of the first wireless device or the second wireless device with a frequency shift based on the frequency shifting configuration.

5. The apparatus of claim 4, wherein the at least one processor is further configured to cause the repeater to:
    transmit, to the first wireless device, an indication that the repeater supports the frequency shifting configuration prior to receiving the frequency shifting configuration.

6. The apparatus of claim 1, wherein the at least one processor is further configured to cause the repeater to:
    measure the phase noise based on an additional signal to the repeater with one or more transmissions for the repetition to the second wireless device.

7. The apparatus of claim 6, wherein the additional signal includes at least one of a demodulation reference signal (DMRS) for the repeater, a phase tracking reference signal (PTRS), or an additional reference signal for the repeater.

8. The apparatus of claim 6, wherein the additional signal is multiplexed in at least one of time resources or frequency resources with at least one transmission from the first wireless device for the second wireless device.

9. The apparatus of claim 6, wherein the at least one processor is further configured to cause the repeater to:
    transmit, to the first wireless device, a signal repetition of the one or more transmissions from the second wireless device including the additional signal from the repeater, wherein the additional signal includes at least one of a demodulation reference signal (DMRS) for the first wireless device, a phase tracking reference signal (PTRS), or an additional reference signal for the first wireless device, the additional signal being multiplexed in at least one of time resources or frequency resources with a signal from the second wireless device.

10. The apparatus of claim 1, wherein the first wireless device is a base station and the second wireless device is a user equipment (UE).

11. The apparatus of claim 1, wherein the first wireless device is a first user equipment (UE) and the second wireless device is a second UE.

12. A method of wireless communication at a repeater, comprising:
    receiving, from a first wireless device, a request for the repeater to report a phase noise in transmissions between the first wireless device and the repeater for repetition with a second wireless device; and
    transmitting a report of the phase noise to the first wireless device based on the request.

13. The method of claim 12,
    wherein the request indicates for the repeater to report the phase noise if the phase noise exceeds a phase noise threshold, the report being based on the phase noise exceeding the phase noise threshold.

14. The method of claim 12, further comprising:
    receiving a frequency shifting configuration from the first wireless device;
    receiving one or more signals from one of the first wireless device or the second wireless device; and transmitting the repetition of the one or more signals to another of the first wireless device or the second wireless device with a frequency shift based on the frequency shifting configuration.

15. The method of claim 14, further comprising:
transmitting, to the first wireless device, an indication that the repeater supports the frequency shifting configuration prior to receiving the frequency shifting configuration.

16. The method of claim 12, further comprising:
measuring the phase noise based on an additional signal to the repeater with one or more transmissions for the repetition to the second wireless device.

17. The method of claim 16, wherein the additional signal includes at least one of a demodulation reference signal (DMRS) for the repeater, a phase tracking reference signal (PTRS), or an additional reference signal for the repeater.

18. The method of claim 16, wherein the additional signal is multiplexed in at least one of time resources or frequency resources with at least one transmission from the first wireless device for the second wireless device.

19. The method of claim 16, further comprising:
transmitting, to the first wireless device, a signal repetition of the one or more transmissions from the second wireless device including the additional signal from the repeater, wherein the additional signal includes at least one of a demodulation reference signal (DMRS) for the first wireless device, a phase tracking reference signal (PTRS), or an additional reference signal for the first wireless device, the additional signal being multiplexed in at least one of time resources or frequency resources with a signal from the second wireless device.

20. The method of claim 12, wherein the first wireless device is a base station and the second wireless device is a user equipment (UE).

21. The method of claim 12, wherein the first wireless device is a first user equipment (UE) and the second wireless device is a second UE.

22. A non-transitory computer-readable medium storing computer executable code at a repeater, the code when executed by at least one processor causes the at least one processor to:
receive, from a first wireless device, a request for the repeater to report a phase noise in transmissions between the first wireless device and the repeater for repetition with a second wireless device; and
transmit a report of the phase noise to the first wireless device based on the request.

23. The non-transitory computer-readable medium of claim 22, wherein the request indicates for the repeater to report the phase noise if the phase noise exceeds a phase noise threshold, the report being based on the phase noise exceeding the phase noise threshold.

24. The non-transitory computer-readable medium of claim 22, wherein the code when executed by the at least one processor causes the at least one processor to:

receive a frequency shifting configuration from the first wireless device;
receive one or more signals from one of the first wireless device or the second wireless device; and
transmit the repetition of the one or more signals to another of the first wireless device or the second wireless device with a frequency shift based on the frequency shifting configuration.

25. The non-transitory computer-readable medium of claim 24, wherein the code when executed by the at least one processor causes the at least one processor to:
transmit, to the first wireless device, an indication that the repeater supports the frequency shifting configuration prior to receiving the frequency shifting configuration.

26. The non-transitory computer-readable medium of claim 22, wherein the code when executed by the at least one processor causes the at least one processor to:
measure the phase noise based on an additional signal to the repeater with one or more transmissions for the repetition to the second wireless device.

27. The non-transitory computer-readable medium of claim 26, wherein the code when executed by the at least one processor causes the at least one processor to:
transmit, to the first wireless device, a signal repetition of the one or more transmissions from the second wireless device including the additional signal from the repeater, wherein the additional signal includes at least one of a demodulation reference signal (DMRS) for the first wireless device, a phase tracking reference signal (PTRS), or an additional reference signal for the first wireless device, the additional signal being multiplexed in at least one of time resources or frequency resources with a signal from the second wireless device.

28. An apparatus for wireless communication at a repeater, comprising:
means for receiving, from a first wireless device, a request for the repeater to report a phase noise in transmissions between the first wireless device and the repeater for repetition with a second wireless device; and
means for transmitting a report of the phase noise to the first wireless device based on the request.

29. The apparatus of claim 28, further comprising:
means for receiving a frequency shifting configuration from the first wireless device;
means for receiving one or more signals from one of the first wireless device or the second wireless device; and
means for transmitting the repetition of the one or more signals to another of the first wireless device or the second wireless device with a frequency shift based on the frequency shifting configuration.

30. The apparatus of claim 29, further comprising:
means for transmitting, to the first wireless device, an indication that the repeater supports the frequency shifting configuration prior to receiving the frequency shifting configuration.

* * * * *